(12) United States Patent
Wang et al.

(10) Patent No.: US 12,347,107 B2
(45) Date of Patent: Jul. 1, 2025

(54) MEDICAL IMAGE PROCESSING METHOD AND APPARATUS, DEVICE, STORAGE MEDIUM, AND PRODUCT

(71) Applicant: Tencent Technology (Shenzhen) Company Limited, Shenzhen (CN)

(72) Inventors: Liang Wang, Shenzhen (CN); Jianhua Yao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 440 days.

(21) Appl. No.: 17/974,453

(22) Filed: Oct. 26, 2022

(65) Prior Publication Data

US 2023/0052133 A1 Feb. 16, 2023

Related U.S. Application Data

(63) Continuation of application No. PCT/CN2021/124781, filed on Oct. 19, 2021.

(30) Foreign Application Priority Data

Nov. 2, 2020 (CN) .......................... 202011205406.5

(51) Int. Cl.
*G06T 7/00* (2017.01)
*G06T 7/11* (2017.01)
(Continued)

(52) U.S. Cl.
CPC .............. *G06T 7/0014* (2013.01); *G06T 7/11* (2017.01); *G06T 7/149* (2017.01); *H04N 1/6005* (2013.01);
(Continued)

(58) Field of Classification Search
CPC ......... G06T 7/0014; G06T 7/11; G06T 7/149; G06T 2207/10024; G06T 2207/20224;
(Continued)

(56) References Cited

U.S. PATENT DOCUMENTS

2010/0189319 A1* 7/2010 Wu ...................... G06V 10/755
382/128
2017/0270346 A1* 9/2017 Ascierto ................ G06V 20/69
(Continued)

FOREIGN PATENT DOCUMENTS

CN 110148113 A 8/2019
CN 110910348 A 3/2020
(Continued)

OTHER PUBLICATIONS

Tencent Technology, Extended European Search Report and Supplementary Search Report, EP Patent Application No. 21884985.9, Jan. 8, 2024, 7 pgs.
(Continued)

*Primary Examiner* — David Perlman
(74) *Attorney, Agent, or Firm* — Morgan, Lewis & Bockius LLP

(57) ABSTRACT

A computer device obtains a medical image set. The device identifies a difference between the reference medical image and the target medical image to obtain a candidate non-lesion region in the target medical image. The device determines area size information of the candidate non-lesion region as candidate area size information. The device adjusts the candidate non-lesion region according to the annotated area size information when the candidate area size information does not match the annotated area size information, so as to obtain a target non-lesion region in the target medical image.

20 Claims, 7 Drawing Sheets

(51) Int. Cl.
*G06T 7/149* (2017.01)
*H04N 1/60* (2006.01)

(52) U.S. Cl.
CPC ............... *G06T 2207/10024* (2013.01); *G06T 2207/20224* (2013.01); *G06T 2207/30068* (2013.01); *G06T 2207/30096* (2013.01)

(58) Field of Classification Search
CPC ........... G06T 2207/30068; G06T 2207/30096; H04N 1/6005
See application file for complete search history.

(56) References Cited

U.S. PATENT DOCUMENTS

| | | | |
|---|---|---|---|
| 2018/0300878 A1 | 10/2018 | Ihara | |
| 2019/0357870 A1* | 11/2019 | Madabhushi | ........ G06V 10/764 |
| 2021/0313045 A1* | 10/2021 | Wu | ........ G06V 10/764 |
| 2021/0319880 A1* | 10/2021 | Tomii | ........ G16H 50/70 |

FOREIGN PATENT DOCUMENTS

| | | |
|---|---|---|
| CN | 111062390 A | 4/2020 |
| CN | 111291813 A | 6/2020 |
| CN | 112330624 A | 2/2021 |

OTHER PUBLICATIONS

Zhipeng Jia et al., "Constrained Deep Weak Supervision for Histopathology Image Segmentation", IEEE Transactions on Medical Imaging, vol. 36, Iss. 11, DOI: 10.1109/TMI.2017.2724070, Nov. 2017, 11 pgs.
Tencent Technology, ISR, PCT/CN2021/124781, Jan. 18, 2022, 2 pgs.
Tencent Technology, WO, PCT/CN2021/124781, Jan. 18, 2022, 4 pgs.
Tencent Technology, IPRP, PCT/CN2021/124781, May 2, 2023, 5 pgs.

* cited by examiner

MEDICAL IMAGE PROCESSING METHOD AND APPARATUS, DEVICE, STORAGE MEDIUM, AND PRODUCT

CROSS-REFERENCE TO RELATED APPLICATION

This application is a continuation application of PCT Patent Application No. PCT/CN2021/124781, entitled "MEDICAL IMAGE PROCESSING METHOD, APPARATUS, DEVICE, STORAGE MEDIUM, AND PRODUCT" filed on Oct. 19, 2021, which claims priority to Chinese Patent Application No. 202011205406.5, filed with the State Intellectual Property Office of the People's Republic of China on Nov. 2, 2020, and entitled "MEDICAL IMAGE PROCESSING METHOD AND DEVICE", all of which are incorporated herein by reference in their entirety.

FIELD OF THE TECHNOLOGY

This application relates to the technical field of artificial intelligence (AI), and specifically to a medical image processing method and apparatus, a computer device, a computer-readable storage medium, and a computer program product.

BACKGROUND OF THE DISCLOSURE

Image segmentation is a process of dividing an image into several specific regions with unique properties and recognizing regions of interest. With the development of computer technologies and medical analysis technologies, medical image segmentation become the top priority of the medical analysis technologies and is the key problem to deciding whether a medical image can provide reliable evidence in clinical diagnosis and treatment. For example, during the pathological analysis of breast cancer, a non-lesion region (e.g., a normal region, a non-cancerous region, a non-tumor region, etc.) is obtained from a medical image including the breast. The non-lesion region refers to a region in the medical image for reflecting no lesions, that is, a region where immune cells are located. In practical applications, a treatment plan for breast cancer can be formulated according to the non-lesion region. However, regarding the recognition of non-lesion regions in a medical image, in related technologies, the medical image is mainly read manually, and regions of interest (such as non-lesion regions) are marked from the medical image. Due to the subjectivity of the manual reading method, the accuracy of a recognized region is lower.

SUMMARY

The embodiments of this application provide a medical image processing method and apparatus, a computer device, a computer-readable storage medium, and a computer program product, which can improve the recognition efficiency and accuracy of a non-lesion region.

An embodiment of this application provides a medical image processing method, including:

obtaining a medical image set, the medical image set including a reference medical image, a target medical image (e.g., to be recognized), and annotated (e.g., marked) size information of a non-lesion region in the target medical image, the target medical image including a lesion region and the non-lesion region, and the reference medical image including a lesion region;

determining (e.g., identifying) the difference between the reference medical image and the target medical image to obtain a candidate non-lesion region in the target medical image;

determining area size information of the candidate non-lesion region as candidate area size information; and adjusting the candidate non-lesion region according to the annotated (e.g., marked) area size information when the candidate area size information does not match the annotated area size information, so as to obtain a target non-lesion region in the target medical image.

An embodiment of this application further provides a medical image processing apparatus, including:

an obtaining module, configured to obtain a medical image set, the medical image set including a reference medical image, a target medical image to be recognized, and annotated size information of a non-lesion region in the target medical image, the target medical image including a lesion region and the non-lesion region, and the reference medical image including a lesion region;

a recognition module, configured to recognize the difference between the reference medical image and the target medical image to obtain a candidate non-lesion region in the target medical image;

a determining module, configured to determine region size information of the candidate non-lesion region as candidate region size information; and an adjusting module, configured to adjust the candidate non-lesion region according to the annotated area size information when the candidate region size information is not matched with the annotated area size information, so as to obtain a target non-lesion region in the target medical image.

An embodiment of this application further provides a computer device, including: a processor and a memory; and the processor being connected to the memory, the memory being configured to store a computer program, and the processor being configured to invoke the computer program, to perform the medical image processing method according to the embodiments of this application.

Another embodiment of this application further provides a non-transitory computer-readable storage medium, storing a computer program, the computer program including a program or instructions, the program and the instructions, when executed by a processor, performing the foregoing medical image processing method in the embodiments of this application.

An embodiment of this application further provides a computer program product, the computer program product including a computer program or instructions, the computer program or the instructions being stored in a computer-readable storage medium. A processor of a computer device reads the computer program code or the instructions from the computer-readable storage medium, and the processor executes the computer program code or the instructions, to cause the computer device to implement the following operations:

obtaining a medical image set, the medical image set including a reference medical image, a target medical image to be recognized, and annotated size information of a non-lesion region in the target medical image, the target medical image including a lesion region and the non-lesion region, and the reference medical image including a lesion region;

recognizing the difference between the reference medical image and the target medical image to obtain a candidate non-lesion region in the target medical image;

determining region size (e.g., area size) information of the candidate non-lesion region as candidate region size information; and adjusting the candidate non-lesion region according to the annotated size information when the candidate region size information does not match the annotated size information, so as to obtain a target non-lesion region in the target medical image.

An embodiment of this application further provides a computer device, including: a processor and a memory;

wherein the processor is configured to invoke a device-controlled application program stored in the memory, so as to:

obtain a medical image set, the medical image set including a reference medical image, a target medical image to be recognized, and annotated area size information of a non-lesion region in the target medical image, the target medical image including a lesion region and the non-lesion region, and the reference medical image including a lesion region;

recognize the difference between the reference medical image and the target medical image to obtain a candidate non-lesion region in the target medical image;

determine region size information of the candidate non-lesion region as candidate region size information; and adjusting the candidate non-lesion region according to the annotated area size information when the candidate region size information does not match the annotated area size information, so as to obtain a target non-lesion region in the target medical image.

In the embodiment of this application, the computer device can recognize the difference between the target medical image and the reference medical image to obtain the candidate non-lesion region in the target medical image, and obtain the region size information of the candidate non-lesion region to obtain the candidate region size information. If the candidate region size information is not matched with the annotated area size information of the target medical image, it indicates that the difference between the recognized candidate non-lesion region and an actual non-lesion region in the target medical image is larger, that is, the accuracy of the recognized candidate non-lesion region is lower. Therefore, the candidate non-lesion region can be adjusted according to the annotated area size information to obtain a target non-lesion region in the target medical image. In other words, the candidate non-lesion region in the target medical image is automatically recognized according to the reference medical image and the target medical image without manual participation, so that the accuracy and efficiency of recognizing the non-lesion region can be improved; and the recognized candidate non-lesion region is adjusted according to the annotated size information, so that the accuracy of recognizing the non-lesion region can be improved.

DESCRIPTION OF EMBODIMENTS

Figure 1:
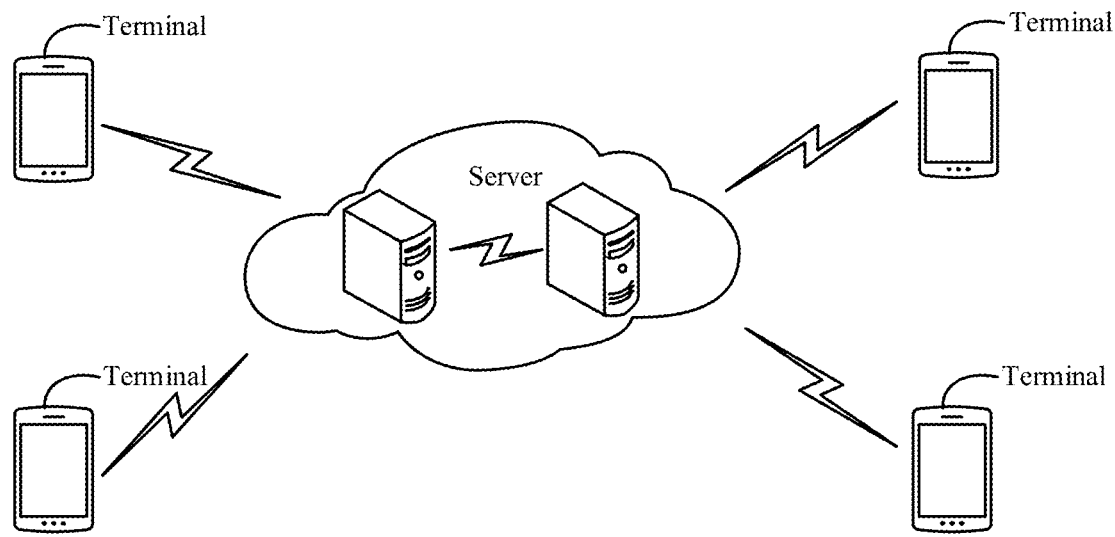
FIG. 1 is a schematic architectural diagram of a medical image processing system provided by an embodiment of this application.

The technical solutions in embodiments of this application are clearly and completely described below with reference to the accompanying drawings in the embodiments of this application. The described embodiments are merely some rather than all of the embodiments of this application. All other embodiments obtained by a person of ordinary skill in the art based on the embodiments of this application without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. The basic AI technologies generally include technologies such as a sensor, a dedicated AI chip, cloud computing, distributed storage, a medical image processing technology, an operating/interaction system, and electromechanical integration. AI software technologies mainly include a computer vision technology, a speech processing technology, a natural language processing (NLP) technology, machine learning (ML)/deep learning, and the like.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multi-dimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition.

The medical image processing method provided by the embodiments of this application mainly relate to CV in AI. For example, a non-lesion region in a medical image is automatically recognized by CV, so that the accuracy of recognizing the non-lesion region can be improved.

First, a medical image processing system for implementing a medical image processing method provided by an embodiment of this application is introduced. As shown in FIG. 1, the medical image processing system includes a server and at least one terminal, wherein the server may refer to a device for recognizing a region of interest (such as a lesion region or a non-lesion region) in a medical image. In the embodiment of this application, a non-lesion region is taken as a region of interest for description. A terminal may refer to a user-oriented front-end device. For example, a terminal may refer to a device for obtaining medical images, such as a medical device, and the terminal can scan a certain part of the human body or animal to obtain medical images. Alternatively, a terminal may refer to a non-medical device (such as a smart phone), and the terminal can obtain medical images from a medical device.

The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, a cloud communication, a middleware service, a domain name service, a security service, a content delivery network (CDN), big data, and an AI platform. The terminal may be a medical device, a smartphone, a tablet computer, a notebook computer, a desktop computer, a smart speaker, a smartwatch, or the like, but is not limited thereto. Each the terminal and the server may be directly or indirectly connected in a wired or wireless communication manner; and Furthermore, the number of terminals and the number of servers may be one or more, which is not limited in the embodiments of this application.

Medical images can be obtained by scanning a certain part of the human body or animal. For example, medical images include CT scan images of the chest, magnetic resonance imaging (MRI) images, and other medical images. A medical image usually includes a lesion region and a non-lesion region. The lesion region may refer to a region for reflecting lesions (e.g., abnormalities, tumors, cancers, etc.) in the medical image, and the non-lesion region may refer to a region for reflecting no lesions (e.g., normal, no abnormality, no tumor, no cancer, etc.) in the medical image. For example, the non-lesion region may refer to a region where immune cells are located in the medical image.

Figure 2A:
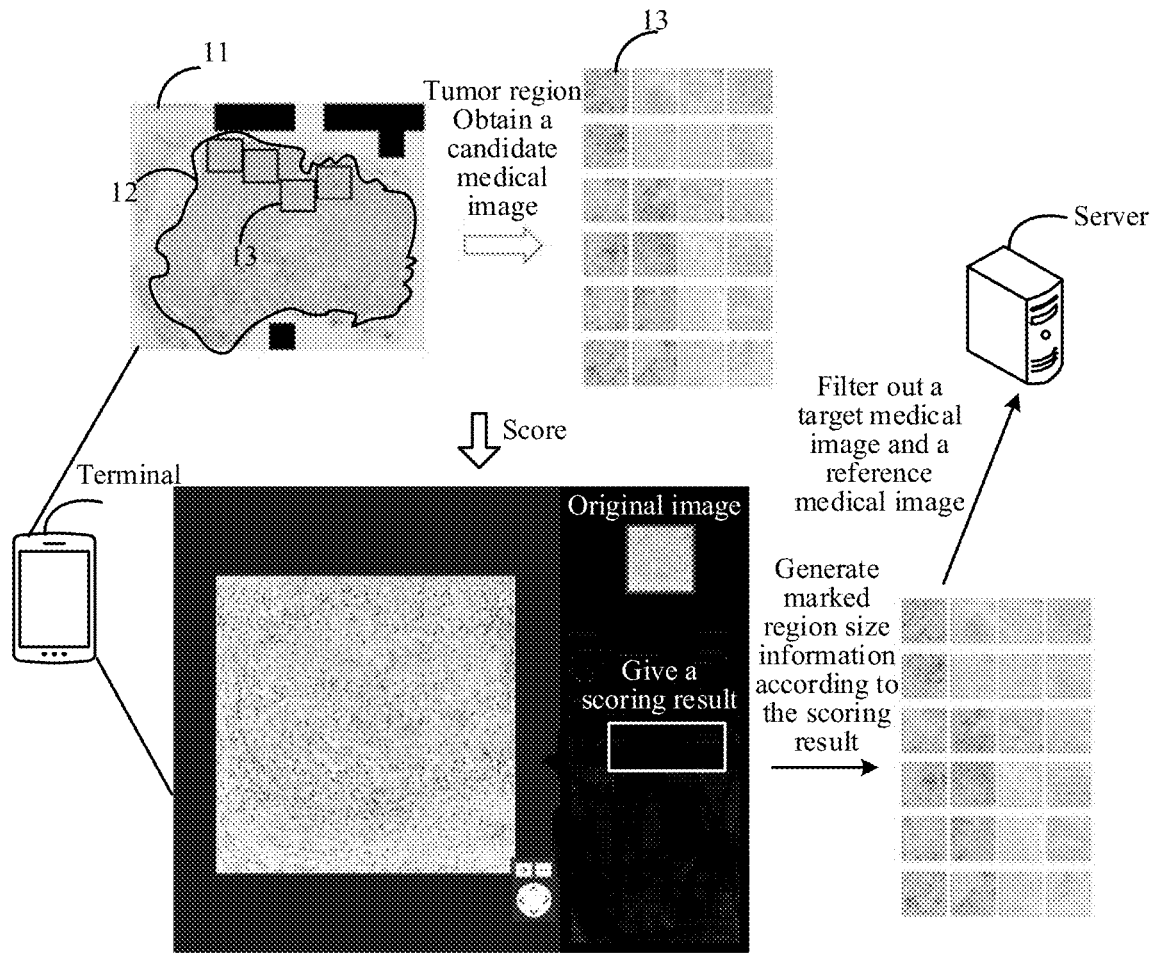
FIG. 2A is a schematic diagram of a scene for data interaction provided by an embodiment of this application.
Figure 2B:
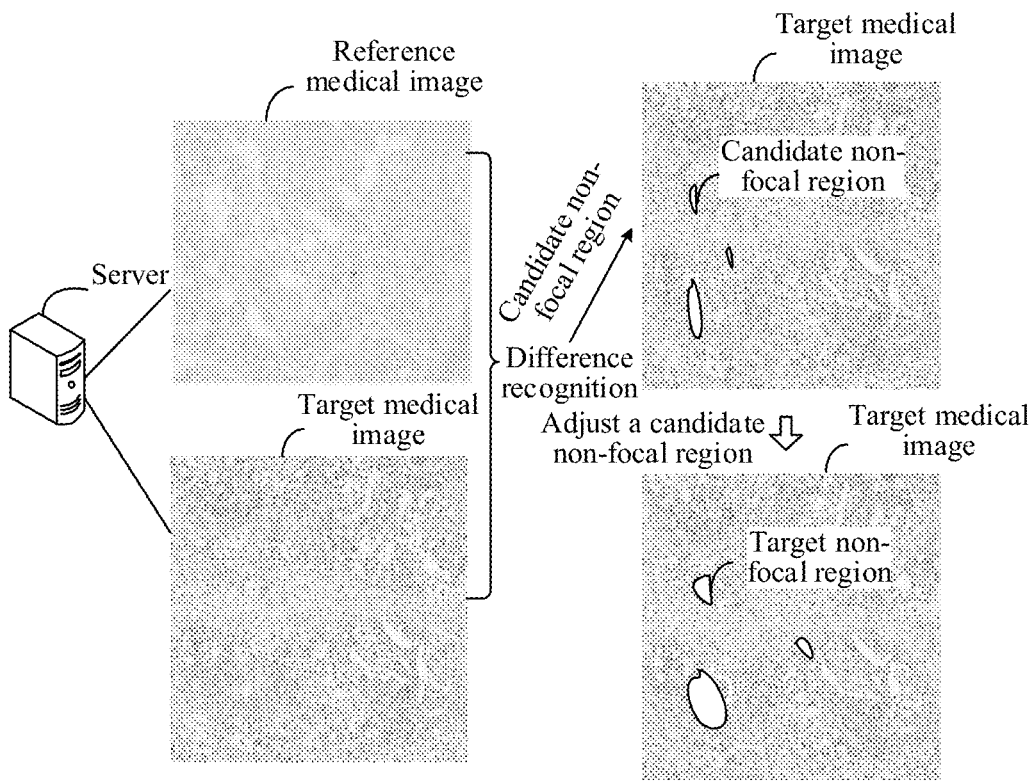
FIG. 2B is a schematic diagram of a scene for data interaction provided by an embodiment of this application.

For ease of understanding, FIG. 2A and FIG. 2B show schematic diagrams of scenes for data interaction provided by the embodiments of this application. In FIG. 2A and FIG. 2B, a medical image related to the breast is taken as an example for illustration. During breast cancer treatment, it is necessary to obtain a non-lesion region in a medical image, and formulate a corresponding treatment plan for a breast cancer patient according to the non-lesion region. Therefore, the embodiments of this application mainly relate to how to recognize a non-lesion region from a medical image. Assuming that the terminal is a medical device, as shown in FIG. 2A, the terminal can scan the breast of a user to obtain a whole slide image (WSI) 11 including the breast. The WSI 11 includes a tumor region 12, the tumor region 12 refers to a region for reflecting tumor lesions, and the tumor region further includes immune cells and lesion cells. The tumor region 12 can be divided to obtain multiple sub-regions, and each sub-region is used as a candidate medical image 13, wherein each candidate medical image includes lesion cells, that is, each candidate medical image includes a lesion region; and the candidate medical image further includes immune cells, that is, the candidate medical image further includes a non-lesion region. The size of the WSI may be 50000 pixels*50000 pixels, 0.344 μm/pixel (micron/pixel). The image size of each candidate medical image is the same, for example, the size of the candidate medical image may be 2160 pixels*2160 pixels, 0.524 μm/pixel. Of course, the sizes of the WSI and the candidate medical image may also be other values, which are not limited in the embodiment of this application. As shown in FIG. 2A, the terminal can display a scoring interface about a medical image, the scoring interface includes a candidate medical image and scoring options for the candidate medical image, and a user can score the candidate medical image through the scoring options to obtain a scoring result. The scoring result may include at least one of a region size of the non-lesion region in the candidate medical image (that is, a marked region size) and a region proportion of the non-lesion region in the candidate medical image (that is, a marked region proportion). Correspondingly, the terminal can obtain the scoring result of the user for the candidate medical image, and use the scoring result as annotated size information of the candidate medical image. Exemplarily, a candidate medical image of which the marked region proportion is zero (or the marked region size is zero) may be selected from candidate medical images as a reference medical image, that is, the reference medical image only includes a lesion region and does not include a non-lesion region; and a candidate medical image of which the marked region proportion is not zero (or the marked region size is not zero) is selected from candidate medical images as a target medical image, that is, the target medical image includes a lesion region and a non-lesion region.

After the terminal obtains the target medical image, the reference medical image and the annotated size information of the target medical image, a medical image set can be generated according to the target medical image, the reference medical image and the annotated size information of the target medical image, that is, the target medical image, the reference medical image and the annotated size information of the target medical image are added to the medical image set, and the medical image set is sent to a server. The reference medical image only includes a lesion region, the target medical image includes a lesion region and a non-lesion region, the lesion region in the reference medical image and the lesion region in the target medical image have similarity, and the lesion region in the reference medical image and the non-lesion region in the target medical image have difference. Therefore, as shown in FIG. 2B, the server can recognize the difference between the reference medical image and the target medical image to obtain a candidate non-lesion region in the target medical image. That is, the reference medical image and the target medical image are compared to obtain a region in the target medical image having the difference from the reference medical image, and the region having the difference is used as a candidate non-lesion region in the target medical image. As shown in FIG. 2B, the target medical image includes multiple candidate non-lesion regions. In FIG. 2B, white regions represent candidate non-lesion regions. FIG. 2B only shows three candidate non-lesion regions. Generally, a target medical image includes three or more candidate regions, and the region size and shape of each candidate non-lesion region are different.

As shown in FIG. 2B, after the server obtains a candidate non-lesion region, candidate region size information of the candidate non-lesion region can be obtained. The candidate region size information is compared with the annotated area size information, and if the candidate region size information is not matched with the annotated area size information, it indicates that the difference between the candidate non-lesion region and an actual non-lesion region in the target medical image is larger. Therefore, the server can adjust the candidate non-lesion region according to the annotated area size information until the candidate non-lesion region is the same as or has a smaller difference from the actual non-lesion region in the target medical image, so as to obtain an adjusted candidate non-lesion region, and the adjusted candidate non-lesion region is determined as a target non-lesion region. The target non-lesion region can be used for formulating a treatment plan for a patient, or can be used for training an image segmentation model, that is, the target non-lesion region is used as marked data for training the image segmentation model. The image segmentation model may refer to a model for recognizing a non-lesion region in a medical image.

It is to be understood that the process of recognizing the non-lesion region in the target medical image may be performed by the server or the terminal, or may be performed by the terminal and the server together, which is not limited in the embodiment of this application. The process of recognizing, by the terminal, the non-lesion region in the target medical image and the process of recognizing, by the terminal and the server together, the non-lesion region in the target medical image may refer to the process of recognizing, by the server, the non-lesion region in the target medical image, and repeated contents are not described.

Figure 3:
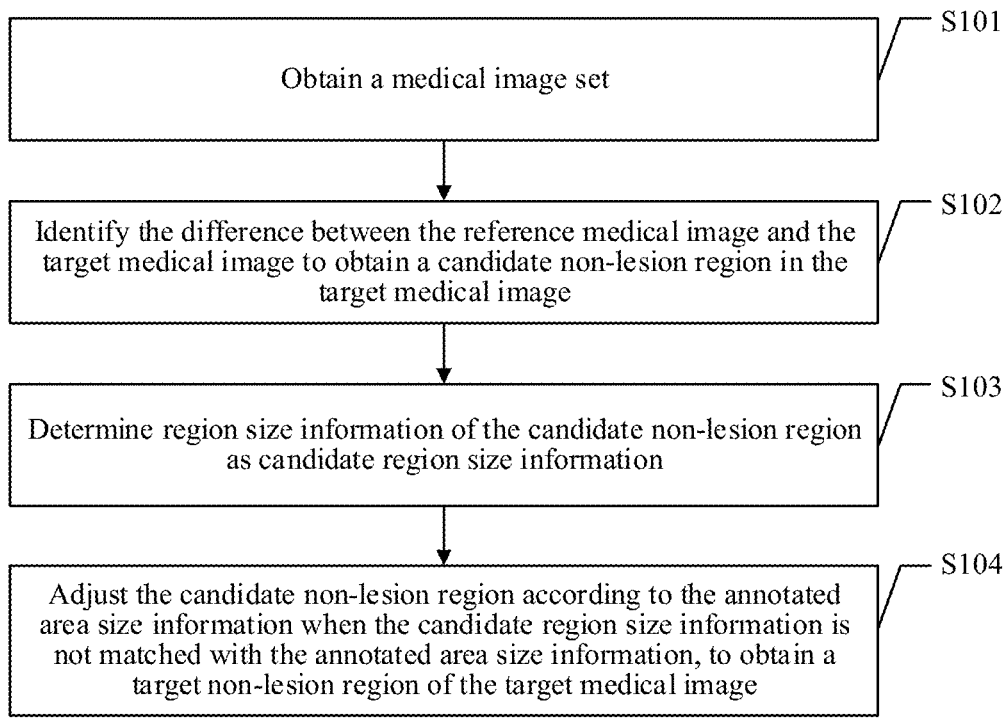
FIG. 3 is a schematic flowchart of a medical image processing method provided by an embodiment of this application.

Based on the above description, FIG. 3 is a schematic flowchart of a medical image processing method provided by an embodiment of this application. The method may be performed by a computer device. The computer device may refer to the terminal or the server in FIG. 1, or the computer device may refer to the terminal and the server in FIG. 1, that is, the method may be performed by the terminal and the server together. As shown in FIG. 3, the medical image processing method may include the following steps S101 to S104.

S101: Obtain a medical image set, wherein the medical image set includes a reference medical image, a target medical image to be recognized, and annotated area size information of a non-lesion region in the target medical image, the target medical image includes a lesion region and the non-lesion region, and the reference medical image includes a lesion region.

A computer device can obtain a medical image set, wherein the medical image set includes a reference medical image, a target medical image to be recognized, and annotated area size information of the target medical image, the target medical image includes a lesion region and a non-lesion region, and the reference medical image includes a lesion region; and the annotated area size information includes at least one of an area size of the non-lesion region in the target medical image (e.g., a marked region size) and an area proportion of the non-lesion region in the target medical image (that is, a marked area proportion). The annotated area size information may be obtained by marking (such as manually marking) the non-lesion region in the target medical image, that is, the annotated size information can be used as standard region size information of the target medical image.

In some embodiments, a computer device can generate a task for obtaining annotated area size information of a target medical image, publish the task to multiple users (such as multiple doctors), and obtain scores for the target medical image from the multiple users, so as to obtain multiple scores corresponding to the target medical image. The scores corresponding to the target medical image are used to reflect the area proportion of the non-lesion region in the target medical image, or reflect an area size of the non-lesion region. The computer device can obtain the occurrence number of each score corresponding to the target medical image, and determine the score with the maximum occurrence number as the annotated area size information of the target medical image. By determining the annotated area size information of the target medical image according to the occurrence number of the scores corresponding to the target medical image, the accuracy of obtaining the annotated area size information can be improved. In some embodiments, a computer device can average each score corresponding to a target medical image to obtain an average score, and determine the average score as annotated area size information of the target medical image. By determining the annotated area size information of the target medical image by averaging the scores corresponding to the target medical image, the accuracy of obtaining the annotated area size information can be improved.

S102: Perform difference recognition on the reference medical image and the target medical image to obtain a candidate non-lesion region in the target medical image.

Here, the difference recognition is performed on the reference medical image and the target medical image, that is, the difference between the reference medical image and the target medical image is recognized so as to obtain a candidate non-lesion region in the target medical image.

Since a target medical image generally includes a large number of non-lesion regions, it is time-consuming to manually mark the non-lesion regions of the target medical image; and the manual marking method is subjective, resulting in lower accuracy of obtaining the non-lesion region. Therefore, the computer device can recognize the difference between the reference medical image and the target medical image to obtain the candidate non-lesion region in the target medical image, that is, automatically recognize the non-lesion region in the target medical image according to the reference medical image and the target medical image, so that the accuracy and efficiency of recognizing the non-lesion region can be improved.

In some embodiments, since a lesion region in a reference medical image and a lesion region in a target medical image have similarity (that is, the similarity reaches a similarity threshold), and the lesion region in the reference medical image and a non-lesion region in the target medical image have difference, the difference between the reference medical image and the target medical image can be recognized by comparing the reference medical image with the target medical image or matching the lesion regions, so as to determine the lesion region and the candidate non-lesion region in the target medical image.

S103: Determine region size information of the candidate non-lesion region as candidate region size information.

S104: Adjust the candidate non-lesion region according to the annotated size information when the candidate region size information does not match the annotated area size information, so as to obtain a target non-lesion region in the target medical image.

In S103 and S104, after the candidate non-lesion region in the target medical image is obtained, there is a difference between the recognized candidate non-lesion region and an actual non-lesion region in the target medical image. In this case, it is considered that the accuracy of the recognized candidate non-lesion region is lower. Therefore, a computer device needs to adjust the candidate non-lesion region to enable the candidate non-lesion region in the target medical image to be matched with the actual non-lesion region in the target medical image.

For example, the computer device can determine region size information of the candidate non-lesion region to obtain candidate region size information. The candidate region size information includes at least one of a region size of the candidate non-lesion region in the target medical image (that is, a candidate region size) and a region proportion of the candidate non-lesion region in the target medical image (that is, a candidate region proportion). For example, a region proportion of the candidate non-lesion region in the target medical image can be determined according to the number of the pixel points in the candidate non-lesion region and the number of the pixel points in the target medical image, so as to obtain a candidate region proportion; or a region proportion of the candidate non-lesion region in the target medical image can be determined according to a size of the candidate non-lesion region and a size of the target medical image, so as to obtain a candidate region proportion. Exemplarily, the candidate region size information can be determined according to the candidate region proportion;

or the candidate region size information can be determined according to the region size of the candidate non-lesion region. If the candidate region size information is not matched with the annotated area size information, it indicates that the difference between the recognized candidate non-lesion region and an actual non-lesion region in the target medical image is larger, that is, the accuracy of the recognized candidate non-lesion region is lower. Therefore, the candidate non-lesion region can be adjusted according to the annotated area size information to obtain a target non-lesion region in the target medical image. If the candidate region size information matches with the annotated area size information, it indicates that there is no difference between the recognized candidate non-lesion region and an actual non-lesion region in the target medical image, or indicates that there is a smaller difference between the recognized candidate non-lesion region and an actual non-lesion region in the target medical image, that is, the accuracy of the recognized candidate non-lesion region is higher. Therefore, the candidate non-lesion region can be determined as a target non-lesion region in the target medical image.

In the embodiment of this application, since both the target medical image and the reference medical image include lesion regions, and the similarity between the lesion regions of the target medical image and the reference medical image can reach a similarity threshold, the computer device can recognize the difference between the target medical image and the reference medical image to obtain the candidate non-lesion region in the target medical image, and obtain the region size information of the candidate non-lesion region to obtain the candidate region size information. If the candidate region size information is not matched with the annotated area size information of the target medical image, it indicates that the difference between the recognized candidate non-lesion region and an actual non-lesion region in the target medical image is larger, that is, the accuracy of the recognized candidate non-lesion region is lower. Therefore, the candidate non-lesion region can be adjusted according to the annotated size information to obtain a target non-lesion region in the target medical image. In other words, the candidate non-lesion region in the target medical image is automatically recognized according to the reference medical image and the target medical image without manual participation, so that the accuracy and efficiency of recognizing the non-lesion region can be improved; and the recognized candidate non-lesion region is adjusted according to the annotated area size information, so that the accuracy of recognizing the non-lesion region can be improved.

In some embodiments, S102 may include the following steps s11 to s13.

s11: Convert, by the computer device, the reference medical image to an image in a target color space to obtain a converted reference medical image, and convert the target medical image to an image in the target color space to obtain a converted target medical image.

s12: Obtain brightness information of pixel points in the converted reference medical image and brightness information of pixel points in the converted target medical image.

s13: Determine the difference between the reference medical image and the target medical image according to the brightness information of the pixel points in the converted reference medical image and the brightness information of the pixel points in the converted target medical image, so as to obtain a candidate non-lesion region in the target medical image.

In s11 to s13, the same pixel point in a medical image has inconsistencies corresponding brightness information in different color spaces, thereby preventing the accuracy of recognizing the non-lesion region from being affected due to different color spaces of the medical image. The computer device can convert the reference medical image to an image in a target color space to obtain a converted reference medical image, and convert the target medical image to an image in the target color space to obtain a converted target medical image. The target color space may refer to an HED color space, an RGB color space, or other color spaces, which is not limited in the embodiment of this application.

In some embodiments, the brightness information of pixel points in the converted reference medical image and the brightness information of pixel points in the converted target medical image can be obtained. The brightness information may refer to a brightness value or a brightness level. The brightness information of the pixel points in the converted reference medical image and the brightness information of the pixel points in the converted target medical image are compared to recognize the difference between the reference medical image and the target medical image, so as to obtain a candidate non-lesion region in the target medical image. The target medical image and the reference medical image are converted, that is, the target medical image and the reference medical image are converted to a unified color space, thereby preventing the accuracy of recognizing the non-lesion region from being affected due to different color spaces of the medical image, and improving the accuracy of recognizing the candidate non-lesion region.

Figure 4:
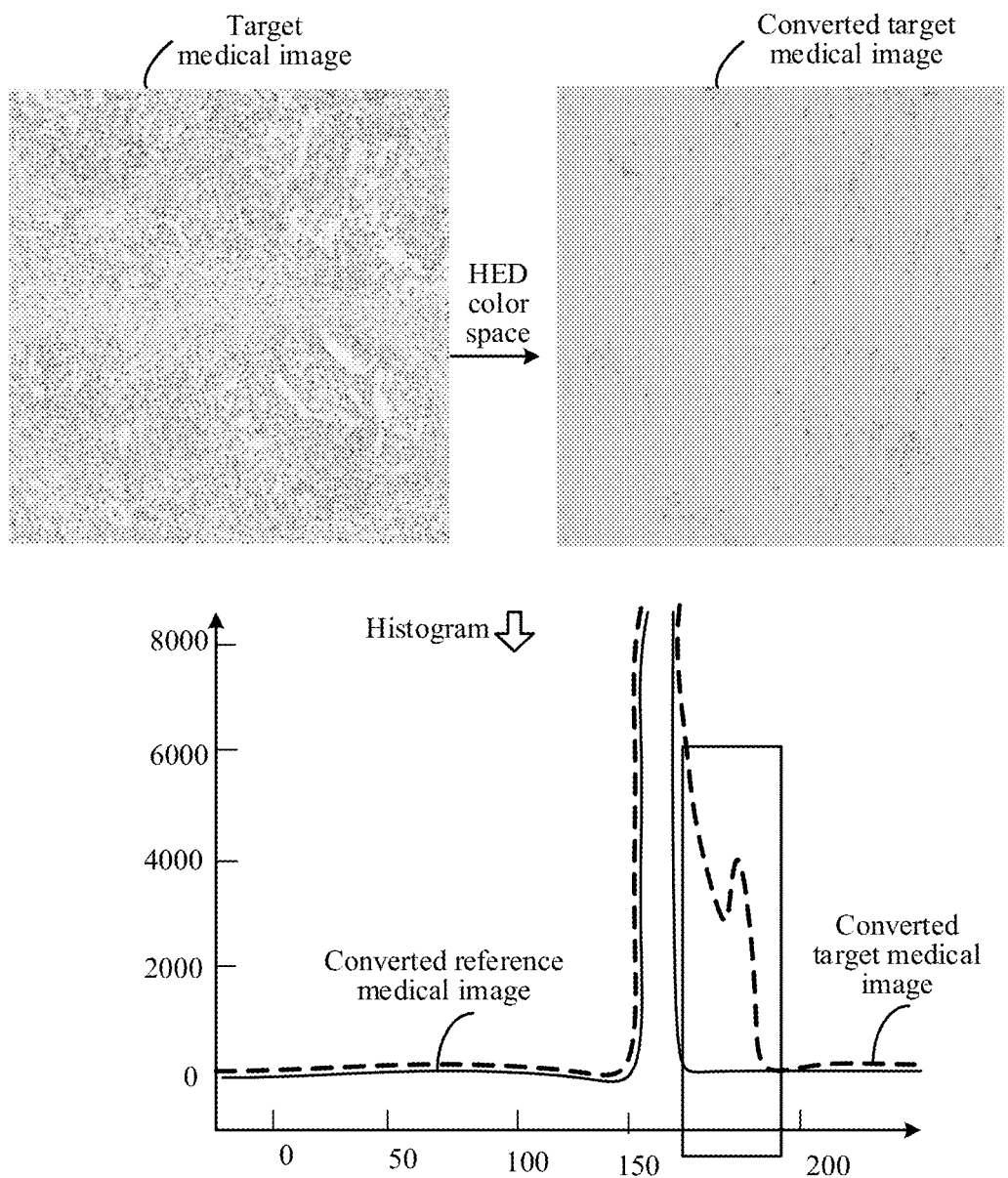
FIG. 4 is a schematic diagram of a scene for obtaining a candidate non-lesion region provided by an embodiment of this application.

For example, as shown in FIG. 4, a computer device can convert a target medical image to an image in an HED color space to obtain a converted target medical image, and decompose a dab channel image from the converted target medical image to obtain a target dab channel image. In a similar way, the computer device can convert a reference medical image to an image in the HED color space to obtain a converted reference medical image, and decompose a dab channel image from the converted reference medical image to obtain a reference dab channel image (not shown in FIG. 4). Then, a histogram is used for describing brightness levels of pixel points in the target dab channel image and the reference dab channel image. In FIG. 4, a horizontal coordinate represents a pixel value corresponding to pixel points in the medical image, and a vertical coordinate represents a brightness level of pixel points in the medical image. In FIG. 4, dotted lines represent a brightness level of pixel points in the target dab channel image (that is, a converted target medical image), and a solid line represents a brightness level of pixel points in the reference dab channel image (that is, a converted reference medical image). As can be seen from FIG. 4, there is a larger difference between the brightness level corresponding to the pixel points of which the pixel values are located in [165, 195] in the target dab channel image and the brightness level corresponding to the pixel points of which the pixel values are located in [165, 195] in the reference dab channel image, and there is a smaller difference between the brightness levels of the pixel points at other pixel values. Therefore, the pixel points of which the pixel values are located in [165, 195] in the converted target medical image may be used as first target pixel points, and a region where the first target pixel points are located in the target medical image may be used as a candidate non-lesion region in the target medical image.

In some embodiments, s13 may include the following steps s21 to s23.

s21: Obtain, by the computer device, the difference between the brightness information of the pixel points in the converted reference medical image and the brightness information of the corresponding pixel points in the converted target medical image.

s22: Recognize pixel points of which the difference corresponding to brightness information is greater than a difference threshold from the converted target medical image as first target pixel points.

s23: Determine a region where the first target pixel points are located in the target medical image as a candidate non-lesion region in the target medical image.

In s21 to s23, the computer device can obtain the difference between the brightness information of the pixel points in the converted reference medical image and the brightness information of the corresponding pixel points in the converted target medical image. The difference may refer to a difference between the brightness value of the pixel points in the converted reference medical image and the brightness value of the corresponding pixel points in the converted target medical image, and the difference may refer to a difference between the brightness values of two pixel points located at the same position in the converted reference medical image and in the converted target medical image. If two pixel points are pixel points in a lesion region, the difference between the brightness information of the two pixel points is smaller or the same. If one pixel point is a pixel point in a lesion region, and the other pixel point is a pixel point in a non-lesion region, the difference between the brightness information of the two pixel points is larger. Therefore, the computer device can recognize pixel points of which the difference corresponding to brightness information is greater than a difference threshold from the converted target medical image as first target pixel points; and determine a region where the first target pixel points are located in the target medical image as a candidate non-lesion region in the target medical image. By determining the candidate non-lesion region according to the difference between the brightness information of the pixel points in the converted reference medical image and the brightness information of the corresponding pixel points in the converted target medical image, the accuracy of recognizing the non-lesion region can be improved.

In some embodiments, S103 may include: obtain, by the computer device, a region size of the candidate non-lesion region and an image size of the target medical image, and determine a ratio of the region size of the candidate non-lesion region to the image size of the target medical image as the candidate region proportion; or, obtain the number of the pixel points in the candidate non-lesion region and the number of the pixel points in the target medical image, and determine a ratio of the number of the pixel points in the candidate non-lesion region to the number of the pixel points in the target medical image as the candidate region proportion.

The computer device can obtain a region size of the candidate non-lesion region and an image size of the target medical image. The region size may refer to an area of candidate non-lesion regions, that is, the region size is a cumulative sum of areas of all candidate non-lesion regions in the target medical image. The image size may refer to an area of the target medical image. A ratio of the region size of the candidate non-lesion region to the image size of the target medical image is determined as the candidate region proportion. For example, the target medical image is a breast medical image of a breast cancer patient. The following formula (1) can be used for representing a candidate region proportion. In formula (1), an immune cell (IC) value represents a candidate region proportion, an IC region area represents an area of candidate non-lesion regions, and a tumor region area represents an area of the target medical image. That is to say, in some embodiments, the IC value is a ratio of (i) the area of candidate non-lesion regions and (ii) the area of the target image area. Since there is a certain error in the recognized candidate non-lesion region, that is, the candidate non-lesion region includes stained immune cells (non-lesion regions) and non-immune cell regions around immune cells (focal regions), the IC region area may be expressed as: IC region area=area of stained immune cells+area of regions around cells.

$$IC \text{ value} = \frac{IC \text{ region area}}{\text{tumor region area}} \qquad (1)$$

Alternatively, the computer device can obtain a cumulative sum of the number of the pixel points in each of the candidate non-lesion regions in the target medical image, so as to obtain the number of the pixel points in the candidate non-lesion region (that is, the total number of the pixel points in the candidate non-lesion region); and obtain the number of the pixel points in the target medical image, and determine a ratio of the number of the pixel points in the candidate non-lesion region to the number of the pixel points in the target medical image as the candidate region proportion. For example, the target medical image is a breast medical image of a breast cancer patient. The following formula (2) can be used for representing a candidate region proportion. In formula (2), an IC value represents a candidate region proportion, the number of the pixel points in an IC region represents the number of the pixel points in the candidate non-lesion region, and the number of the pixel points in a tumor region represents the number of the pixel points in the target medical image.

$$IC\ value = \frac{the\ number\ of\ the\ pixel\ points\ in\ an\ IC\ region}{the\ number\ of\ the\ pixel\ points\ in\ a\ tumor\ region} \quad (2)$$

In some embodiments, after a candidate region proportion of the candidate non-lesion region is obtained, the candidate region proportion can be determined as candidate region size information of the candidate non-lesion region.

In some embodiments, the candidate region size information includes a candidate region proportion of the candidate non-lesion region in the target medical image; and the annotated size information includes a marked region proportion of the non-lesion region in the target medical image. S104 may include the following steps s31 to s33.

s31: Obtain, by the computer device, a region proportion difference (e.g., an area proportion difference, a difference, etc.) between the candidate region proportion (e.g., candidate area proportion) and the marked region proportion (e.g., annotated area proportion).

s32: Determine that the candidate region size information is not matched with the annotated size information when the region proportion difference is greater than a proportion threshold.

s33: Adjust the candidate non-lesion region according to the marked region proportion to obtain the target non-lesion region.

In s31 to s33, the computer device can obtain a region proportion difference between the candidate region proportion and the marked region proportion. If the region proportion difference is less than or equal to a region proportion threshold, it indicates that the difference between the candidate non-lesion region and an actual region in the target medical image is smaller or the same, thereby determining that the candidate region size information is matched with the annotated size information. If the region proportion difference is greater than the proportion threshold, it indicates that the difference between the candidate non-lesion region and the actual region in the target medical image is larger, thereby determining that the candidate region size information is not matched with the annotated size information. Therefore, if the candidate region size information is not matched with the annotated size information, the candidate non-lesion region needs to be reduced according to the marked region proportion to obtain the target non-lesion region, so as to enable the target non-lesion region to be the same as or closer to the actual non-lesion region in the target medical image. By adjusting the candidate non-lesion region according to the marked region proportion when the difference between the candidate non-lesion region and an actual region in the target medical image is larger, the accuracy of recognizing the non-lesion region can be improved.

In some embodiments, s33 may include the following steps s41 to s42.

s41: Expand, by the computer device, the candidate non-lesion region according to the marked region proportion when the candidate region proportion is less than the marked region proportion, so as to obtain the target non-lesion region.

s42: Reduce the candidate non-lesion region according to the marked region proportion when the candidate region proportion is greater than the marked region proportion, so as to obtain the target non-lesion region.

In s41 to s42, if the candidate region size information is does not match (e.g., is different from) the annotated size information, the computer device can reduce the candidate non-lesion region according to the marked region proportion to obtain the target non-lesion region. For example, if the candidate region proportion is less than the marked region proportion, it indicates that the candidate non-lesion region is smaller than an actual non-lesion region in the target medical image, so that the candidate non-lesion region is expanded according to the marked region proportion to obtain the target non-lesion region, that is, the candidate non-lesion region is enlarged according to the marked region proportion to obtain the target non-lesion region. If the candidate region proportion is greater than the marked region proportion, it indicates that the candidate non-lesion region is larger than the actual non-lesion region in the target medical image, so that the candidate non-lesion region can be reduced according to the marked region proportion to obtain the target non-lesion region. By expanding or reducing the candidate non-lesion region according to the marked region proportion, the accuracy of recognizing the non-lesion region can be improved.

In some embodiments, s41 may include the following steps s51 to s54.

s51: Obtain, by the computer device, expanding parameters when the candidate region proportion is less than the marked region proportion, the expanding parameters including an expanding shape and an expanding size.

s52: Iteratively expand the candidate non-lesion region according to the expanding parameters to obtain an expanded candidate non-lesion region.

s53: Obtain a region proportion of the expanded candidate non-lesion region in the target medical image as an expanded region proportion.

s54: Determine the expanded candidate non-lesion region of which the region proportion difference between the expanded region proportion and the marked region proportion is less than the proportion threshold as the target non-lesion region.

In s51 to s54, if the candidate region proportion is less than the marked region proportion, it indicates that the candidate non-lesion region is smaller than an actual non-lesion region in the target medical image. Therefore, the computer device can obtain the expanding parameters which include the expanding shape and the expanding size. The expanding shape includes at least one of a rectangle, a trapezoid and a rhombus, and the expanding size refers to a size of each expansion. In some embodiments, the candidate non-lesion region can be iteratively expanded according to the expanding parameters to obtain an expanded candidate non-lesion region, that is, the candidate non-lesion region can be expanded many times according to the expanding parameters to obtain multiple expanded candidate non-lesion regions. For example, first, the candidate non-lesion region can be expanded according to the expanding parameters to obtain a first expanded candidate non-lesion region; and then, the first expanded candidate non-lesion region is expanded according to the expanding parameters to obtain a second expanded candidate non-lesion region, and so on. After the expanded candidate non-lesion region is obtained, the computer device can obtain a region proportion of the expanded candidate non-lesion region in the target medical image as an expanded area proportion, that is, a proportion of a region size of the expanded candidate non-lesion region to an image size of the target medical image can be obtained to obtain an expanded area proportion; or a proportion of the number of the pixel points in the expanded candidate non-lesion region to the number of the pixel points in the target medical image can be obtained to obtain an expanded region proportion. After the expanded region proportion is obtained, an area proportion difference between the expanded region proportion and the annotated area proportion can be obtained, and the expanded candidate non-lesion region of which the area proportion difference between the expanded region proportion and the annotated area proportion is less than the proportion threshold is determined as the target non-lesion region. By adjusting the candidate non-lesion region in a manner of iteratively expanding the candidate non-lesion region, that is, by finely adjusting the candidate non-lesion region many times, the accuracy of obtaining the non-lesion region can be improved.

Figure 5:
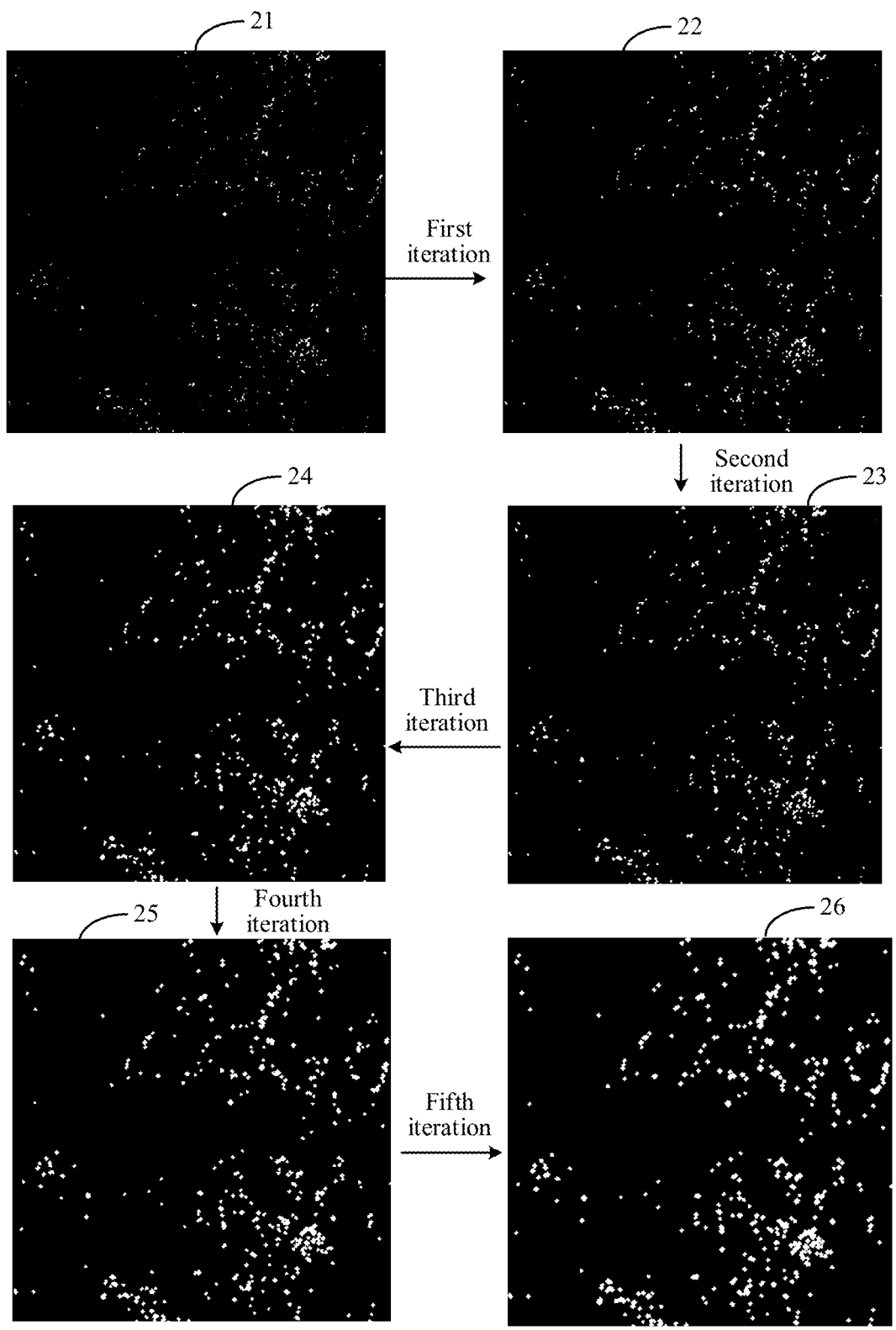
FIG. 5 is a schematic diagram of a scene for iteratively expanding a candidate non-lesion region provided by an embodiment of this application.

For example, if the candidate area proportion is 0.6% and the marked region proportion is 2.0%, the candidate area proportion is less than the marked region proportion. As shown in FIG. 5, the computer device can adjust the candidate non-lesion region according to the expanding parameters. For ease of differentiation, before the candidate non-lesion region is adjusted, the target medical image may be binarized according to the candidate non-lesion region. For example, a black color is used for representing a lesion region in the target medical image, and a white color is used for representing a non-lesion region in the target medical image, thereby obtaining a processed target medical image 21. Assuming that iteration parameters are as follows:

kernel=disk(1).astype(np.uint8)

mask_ic=cv2. dilate(mask_init,kernel,
    iterations=ITERATION), wherein ITERATION represents the number of iterations, that is, the number of iterations may be 5 or other values; and mask_init represents a last iteration result, and mask_ic represents a current iteration result, that is, the iteration is performed based on the last iteration result according to the expanding parameters to obtain the current iteration result. The iteration parameters further include expanding parameters, wherein an expanding shape is a trapezoid, and an expanding size is a size of a region corresponding to eight pixel points. As shown in FIG. 5, the candidate non-lesion region in the processed target medical image 21 is expanded according to the expanding parameters to obtain a first expanded target medical image 22. In some embodiments, the first expanded candidate non-lesion region in the first expanded target medical image 22 is expanded according to the expanding parameters to obtain a second expanded target medical image 23. In this way, a third expanded target medical image 24, a fourth expanded target medical image 25 and a fifth expanded target medical image 26 may be obtained. It can be seen from FIG. 5 that the shape of the candidate non-lesion region in the expanded target medical image is similar to a trapezoid, and the region size of the expanded candidate non-lesion region keeps increasing, that is, the expanded area proportion keeps increasing. As shown in FIG. 5, after the first iteration, the expanded area proportion (that is, the area proportion of the expanded candidate non-lesion region in the target medical image) is 1.1%; after the second iteration, the expanded area proportion is 1.8%; after the third iteration, the expanded area proportion is 2.5%; after the fourth iteration, the expanded area proportion is 3.4%; and after the fifth iteration, the expanded area proportion is 4.3%. Since the expanded region proportion which is 1.8% is closer to the annotated area proportion which is 2%, the expanded candidate non-lesion region obtained after the second iteration can be used as a target non-lesion region.

It is to be understood that in the process of adjusting the candidate non-lesion region, the image size of the target medical image remains unchanged, and only the region size and shape of the candidate non-lesion region are changed, or only the region size of the candidate non-lesion region is changed.

In some embodiments, s41 may include the following steps s61 to s64.

s61: Obtain pixel values of pixel points adjacent to the candidate non-lesion region in the target medical image and pixel values of pixel points in the candidate non-lesion region when the candidate area proportion is less than the marked area proportion.

s62: Cluster the pixel points in the candidate non-lesion region and the pixel points adjacent to the candidate non-lesion region according to the pixel values of the pixel points in the candidate non-lesion region and the pixel values of the pixel points adjacent to the candidate non-lesion region, so as to obtain a clustered region.

s63: Obtain an area proportion of the clustered region in the target medical image as a clustered region proportion.

s64: Determine the clustered region (e.g., area) as the target non-lesion region when the area proportion difference between the clustered region proportion and the marked region proportion is less than the proportion threshold.

In s61 to s64, if the candidate region proportion is less than the marked region proportion, it indicates that the candidate non-lesion region is smaller than an actual non-lesion region in the target medical image, therefore, the computer device can obtain the pixel values of the pixel points adjacent to the candidate non-lesion region in the target medical image and the pixel values of the pixel points in the candidate non-lesion region. In some embodiments, the pixel points in the candidate non-lesion region and the pixel points adjacent to the candidate non-lesion region can be clustered according to the pixel values of the pixel points in the candidate non-lesion region and the pixel values of the pixel points adjacent to the candidate non-lesion region, so as to obtain a clustered region. The pixel points of which the difference between the pixel values in the adjacent pixel points and the pixel values of the pixel points in the candidate non-lesion region is less than a pixel difference threshold and the pixel points in the candidate non-lesion region are clustered, and a region where the pixel points of the same type as the pixel points in the candidate non-lesion region and the pixel points in the candidate non-lesion region are located is determined as a clustered region. Then, a region proportion of the clustered region in the target medical image can be obtained as a clustered region proportion, that is, a proportion of a region size of the clustered region to an image size of the target medical image can be obtained to obtain a clustered region proportion; or a proportion of the number of the pixel points in the clustered region to the number of the pixel points in the target medical image can be obtained to obtain a clustered region proportion. After the clustered region proportion is obtained, a region proportion difference between the clustered region proportion and the marked region proportion can be obtained. If the region proportion difference between the clustered region proportion and the marked region proportion is less than the proportion threshold, the clustered region is determined as the target non-lesion region. If the region proportion difference between the clustered region proportion and the marked region proportion is greater than or equal to the proportion threshold, the pixel points in the candidate non-lesion region and the pixel points adjacent to the candidate non-lesion region are clustered again to obtain a clustered region.

In some embodiments, s62 may include the following steps s71 to s73.

s71: Obtain, by the computer device, a pixel difference between the pixel values of the pixel points adjacent to the candidate non-lesion region and the pixel values of the pixel points in the candidate non-lesion region.

s72: Determine the pixel points of which the corresponding pixel difference is less than a pixel difference threshold from the pixel points adjacent to the candidate non-lesion region as second target pixel points.

s73: Merge the region where the second target pixel points are located in the target medical image with the candidate non-lesion region to obtain the clustered region.

In s71 to s73, the computer device can obtain a pixel difference between the pixel values of the pixel points adjacent to the candidate non-lesion region and the pixel values of the pixel points in the candidate non-lesion region. If the pixel difference between two pixels is less than the pixel difference threshold, it indicates that the two pixel points have similarity. Therefore, the pixel points of which the corresponding pixel difference is less than the pixel difference threshold can be determined from the pixel points adjacent to the candidate non-lesion region as second target pixel points, and the region where the second target pixel points are located in the target medical image are merged with the candidate non-lesion region to obtain the clustered region.

In some embodiments, s42 may include the following steps s81 to s84.

s81: Obtain, by the computer device, reduction processing parameters when the candidate region proportion is greater than the marked region proportion, the reduction processing parameters including a shape of reduction processing and a size of reduction processing.

s82: Iteratively reduce the candidate non-lesion region according to the reduction processing parameters to obtain a reduced candidate non-lesion region.

s83: Obtain an area proportion of the reduced candidate non-lesion region in the target medical image as a reduced region proportion.

s84: Determine the reduced candidate non-lesion region of which the area proportion difference between the reduced area proportion and the annotated area proportion is less than the proportion threshold as the target non-lesion region.

In s81 to s84, if the candidate region proportion is greater than the marked region proportion, it indicates that the candidate non-lesion region is larger than an actual non-lesion region in the target medical image. Therefore, the computer device can obtain reduction processing parameters. The reduction processing parameters include a shape of reduction processing and a size of reduction processing, and the size of reduction processing may refer to a magnitude of reduction processing. In some embodiments, the candidate non-lesion region can be iteratively reduced according to the reduction processing parameters to obtain a reduced candidate non-lesion region, that is, the candidate non-lesion region can be reduced many times according to the reduction processing parameters to obtain multiple reduced candidate non-lesion regions. For example, first, the candidate non-lesion region can be reduced according to the reduction processing parameters to obtain a first reduced candidate non-lesion region; and then, the first reduced candidate non-lesion region is reduced according to the reduction processing parameters to obtain a second reduced candidate non-lesion region, and so on. A region proportion of the reduced candidate non-lesion region in the target medical image is obtained as a reduced region proportion. Then, a region proportion of the reduced candidate non-lesion region in the target medical image can be obtained as a reduced region proportion, that is, a proportion of a region size of the reduced candidate non-lesion region to an image size of the target medical image can be obtained to obtain a reduced region proportion; or a proportion of the number of the pixel points in the reduced candidate non-lesion region to the number of the pixel points in the target medical image can be obtained to obtain a reduced region proportion. After the reduced region proportion is obtained, a region proportion difference between the reduced region proportion and the marked region proportion can be obtained. The reduced candidate non-lesion region of which the region proportion difference between the reduced region proportion and the marked region proportion is less than the proportion threshold is determined as the target non-lesion region. By adjusting the candidate non-lesion region in a manner of iteratively reducing the candidate non-lesion region according to the reduction processing parameters, that is, by finely adjusting the candidate non-lesion region many times, the accuracy of obtaining the non-lesion region can be improved.

In some embodiments, s42 may include: cluster, by the computer device, the pixel points in the candidate non-lesion region according to the pixel values of the pixel points in the candidate non-lesion region when the candidate region proportion is greater than the marked region proportion, and determine a region where the pixel points of the same type are located as a reduced candidate non-lesion region; that is, obtain a pixel difference between the pixel values of all pixel points in the candidate non-lesion region, and remove the region where the pixel points of which the pixel difference is greater than the pixel difference threshold are located from the candidate non-lesion region, so as to obtain a reduced candidate non-lesion region. In some embodiments, a region proportion of the reduced candidate non-lesion region in the target medical image can be obtained as a reduced region proportion. The reduced candidate non-lesion region of which the region proportion difference between the reduced region proportion and the marked region proportion is less than the proportion threshold is determined as the target non-lesion region.

In some embodiments, S103 may include: obtain, by the computer device, a region size of the candidate non-lesion region to obtain a candidate region size, and determine the candidate region size as the candidate region size information.

The computer device can obtain a region size of the candidate non-lesion region to obtain a candidate region size, that is, the candidate region size may refer to an area of the candidate non-lesion region; and the candidate region size can be determined as the candidate region size information.

In some embodiments, the candidate region size information includes a candidate region size of the candidate non-lesion region; and the annotated size information includes a marked region size of the non-lesion region in the target medical image. S104 may include the following steps s91 to s93.

s91: Obtain, by the computer device, an area size difference between the candidate region size and the marked region size.

s92: Determine that the candidate region size information is not matched with the annotated area size information when the area size difference is greater than a size threshold.

s93: Adjust the candidate non-lesion region according to the marked region size to obtain the target non-lesion region.

In s91 to s93, the computer device can obtain a region size difference between the candidate region size and the marked region size. If the region size difference is less than or equal to the size threshold, it indicates that the difference between the candidate non-lesion region and an actual non-lesion region in the target medical image is smaller, so as to determine that the candidate region size information is matched with the annotated size information, so that the candidate non-lesion region can be determined as the target non-lesion region in the target medical image. If the region size difference is greater than the size threshold, it indicates that the difference between the candidate non-lesion region and the actual non-lesion region in the target medical image is larger, so as to determine that the candidate region size information is not matched with the annotated size information, so that the candidate non-lesion region is adjusted according to the marked region size to obtain the target non-lesion region.

In some embodiments, the above-mentioned process of adjusting the candidate non-lesion region according to the marked region size to obtain the target non-lesion region includes: expand the candidate non-lesion region according to the marked region size when the candidate region size is less than the marked region size, so as to obtain the target non-lesion region; and reduce the candidate non-lesion region according to the marked region size when the candidate region size is greater than the marked region size, so as to obtain the target non-lesion region.

An implementation way of expanding, by the computer device, the candidate non-lesion region according to the marked region size to obtain the target non-lesion region may refer to the above-mentioned implementation way of expanding the candidate non-lesion region according to the marked region proportion to obtain the target non-lesion region; an implementation way of reducing, by the computer device, the candidate non-lesion region according to the marked region size to obtain the target non-lesion region may refer to the above-mentioned implementation way of reducing the candidate non-lesion region according to the marked region proportion to obtain the target non-lesion region; and repeated contents are not described.

In some embodiments, the method may further include the following steps s111 to s113.

s111: Mark the target non-lesion region in the target medical image to obtain a marked target medical image.

s112: Predict the target medical image by an image segmentation model to obtain a predicted non-lesion region in the target medical image, and mark (e.g., annotate) the predicted non-lesion region in the target medical image to obtain a predicted target medical image.

s113: Adjust the image segmentation model according to the marked target medical image and the predicted target medical image to obtain a target medical image segmentation model.

Figure 6:
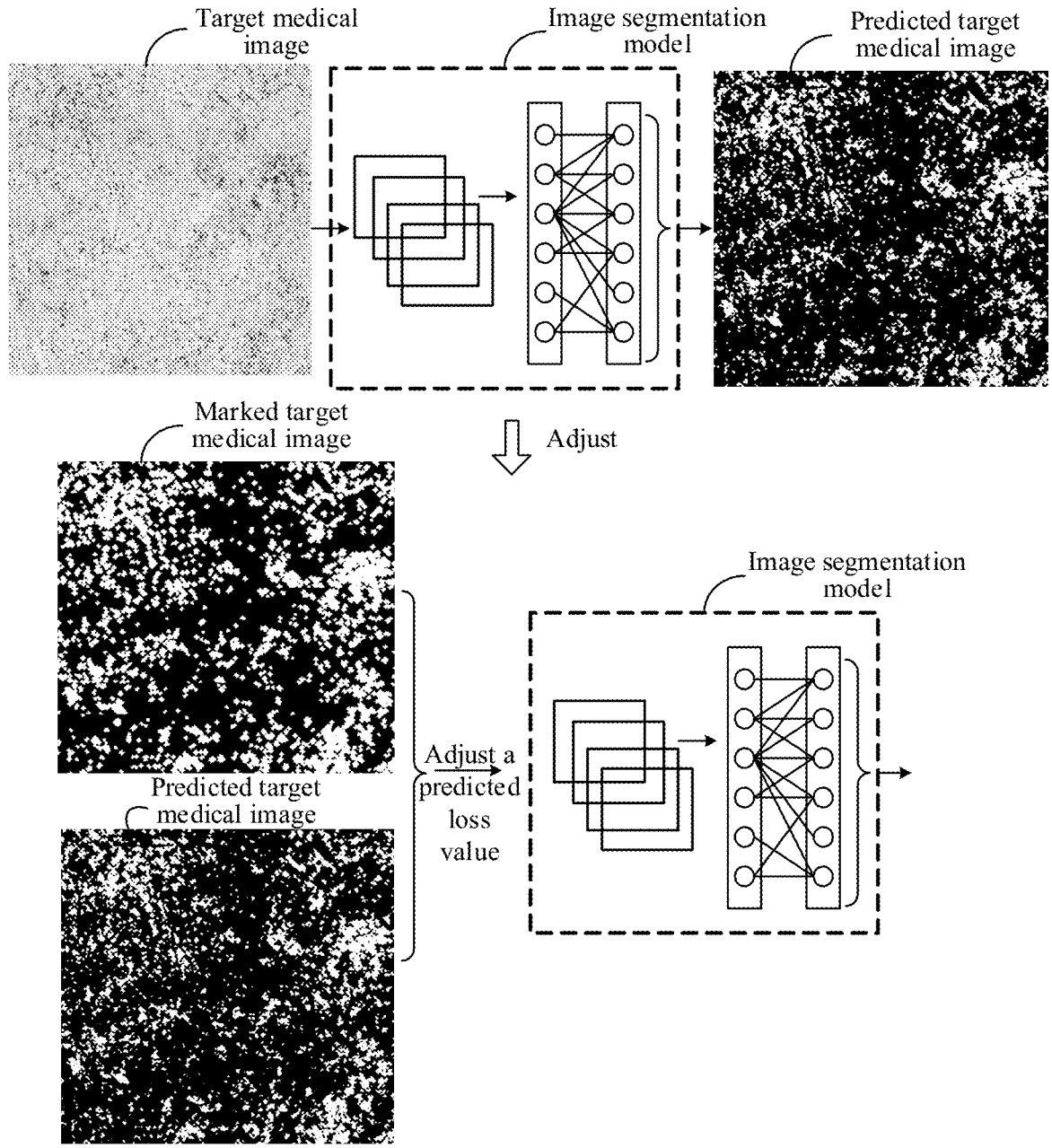
FIG. 6 is a schematic diagram of a scene for adjusting an image segmentation model provided by an embodiment of this application.

In s111 to s113, as shown in FIG. 6, the target non-lesion region of the target medical image can be used for training the image segmentation model. For example, the computer device can mark (e.g., annotate, label) the target non-lesion region in the target medical image to obtain a marked target medical image (that is, a binarized target medical image), that is, the target non-lesion region is marked in the target medical image to distinguish the target non-lesion region and the lesion region in the target medical image, so as to obtain a marked target medical image. In some embodiments, the target medical image can be predicted by an image segmentation model to obtain a predicted non-lesion region in the target medical image, and the predicted non-lesion region is marked in the target medical image to obtain a predicted target medical image. The image segmentation model may refer to a model for recognizing a non-lesion region in a medical image. It can be seen from FIG. 6 that by training the image segmentation model by the marked target medical image, the edge of the non-lesion region in the predicted target medical image output by the image segmentation model is smoother and more natural, so that the accuracy of recognizing the non-lesion region can be improved.

Figure 7:
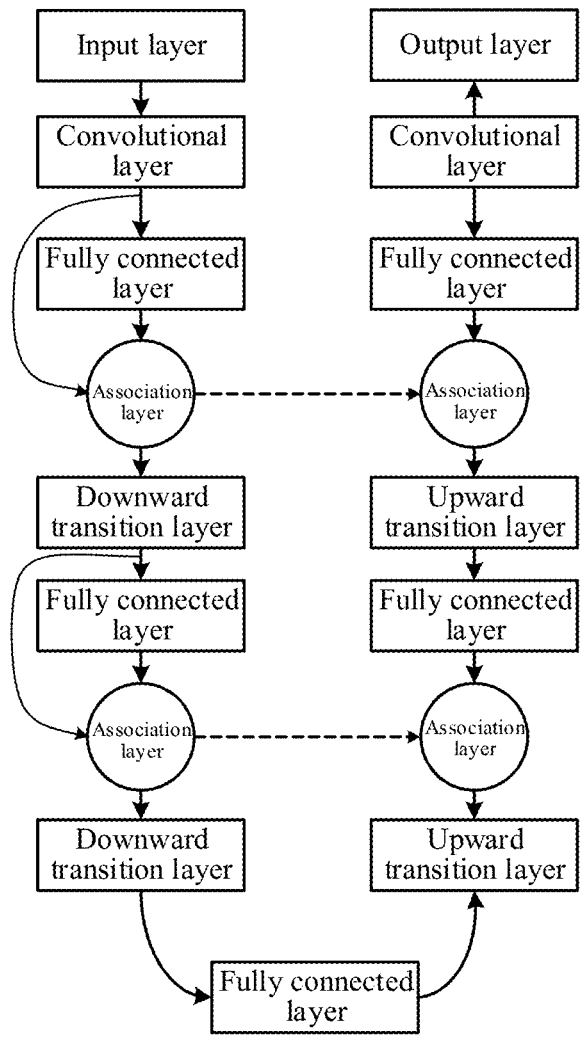
FIG. 7 is a schematic diagram of an image segmentation model provided by an embodiment of this application.

As shown in FIG. 7, the image segmentation model may refer to an FC-DenseNet model, the FC-DenseNet model may include a down-sampling path, an up-sampling path and skip connections, and the skip connections help the up-sampling path recover spatial details by reusing characteristic patterns, wherein the down-sampling path includes an input layer, a convolutional layer, a fully connected layer, an association layer and a downward transition layer; and the up-sampling path includes an output layer, a convolution layer, a fully connected layer, an association layer and an upward transition layer. In some embodiments, the image segmentation model may also be other models, including but not limited to: a fully convolutional network (FCN), an SegNet, a PSPNet, etc.

In some embodiments, s113 may include the following steps s121 to s122.

s121: Determine, by the computer device, a predicted loss value of the image segmentation model according to the marked target medical image and the predicted target medical image.

s123: Adjust the image segmentation model according to the predicted loss value when the predicted loss value does not meet a convergence condition, so as to obtain a target medical image segmentation model.

In s121 to s122, the computer device can use the marked target medical image as the marked data for training an image segmentation model, and a predicted loss value of the image segmentation model is determined according to the marked target medical image and the predicted target medical image. The predicted loss value is used for reflecting the accuracy of the image segmentation model for predicting a non-lesion region of a medical image, wherein a larger predicted loss value indicates a lower corresponding accuracy of the image segmentation model; and a smaller predicted loss value indicates a higher corresponding accuracy of the image segmentation model. If the predicted loss value meets the convergence condition, it indicates that the accuracy of the image segmentation model for predicting the non-lesion region of the medical image is higher, therefore, the image segmentation model can be used as a target medical image segmentation model. If the predicted loss value does not meet the convergence condition, it indicates that the accuracy of the image segmentation model for predicting the non-lesion region of the medical image is lower, therefore, the image segmentation model can be adjusted according to the predicted loss value to obtain a target medical image segmentation model.

In some embodiments, sill may include: binarize the target medical image according to the pixel points in the target non-lesion region; and determine the binarized target medical image as the marked target medical image.

The computer device can binarize the target medical image according to the pixel points in the target non-lesion region, that is, a first color is used for marking the pixel points in the target non-lesion region in the target medical image, and a second color is used for marking the pixel points in the lesion region in the target medical image. The first color is different from the second color, for example, the first color may be a white color, and the second color may be a black color. In some embodiments, the binarized target medical image can be determined as the marked target medical image. By binarizing the target non-lesion region and the lesion region in the target medical image, it is beneficial to distinguish the target non-lesion region and the lesion region in the target medical image.

Figure 8:
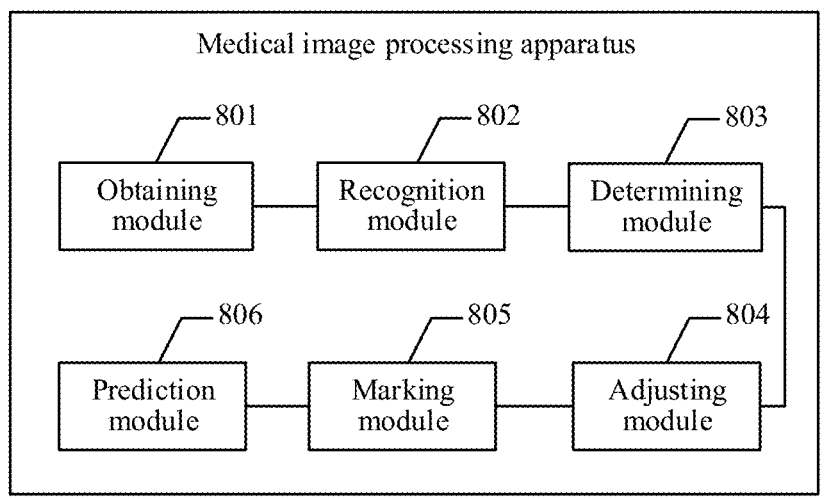
FIG. 8 is a schematic structural diagram of a medical image processing apparatus provided by an embodiment of this application.

FIG. 8 is a schematic structural diagram of a medical image processing apparatus provided by an embodiment of this application. The above-mentioned medical image processing apparatus may be a computer program (including program codes) running in a computer device. For example, the medical image processing apparatus is an application software. The apparatus can be used for performing corresponding steps in the methods provided by the embodiments of this application. As shown in FIG. 8, the medical image processing apparatus may include: an obtaining module 801, a recognition module 802, a determining module 803, an adjusting module 804, a marking module 805, and a prediction module 806.

The obtaining module 801 is configured to obtain a medical image set, wherein the medical image set includes a reference medical image, a target medical image to be recognized, and annotated size information of a non-lesion region in the target medical image, the target medical image includes a lesion region and the non-lesion region, and the reference medical image includes a lesion region;

the recognition module 802 is configured to recognize the difference between the reference medical image and the target medical image to obtain a candidate non-lesion region in the target medical image;

the determining module 803 is configured to determine region size information (e.g., area size information) of the candidate non-lesion region as candidate region (e.g., candidate area) size information; and the adjusting module 804 is configured to adjust the candidate non-lesion region according to the annotated size information when the candidate region size information is not matched with the annotated size information, so as to obtain a target non-lesion region in the target medical image.

In some embodiments, a way of recognizing, by the recognition module 802, the difference between the reference medical image and the target medical image to obtain a candidate non-lesion region in the target medical image includes:

convert the reference medical image to an image in a target color space to obtain a converted reference medical image, and convert the target medical image to an image in the target color space to obtain a converted target medical image;

obtain brightness information of pixel points in the converted reference medical image and brightness information of pixel points in the converted target medical image; and recognize the difference between the reference medical image and the target medical image according to the brightness information of the pixel points in the converted reference medical image and the brightness information of the pixel points in the converted target medical image, so as to obtain a candidate non-lesion region in the target medical image.

In some embodiments, a way of recognizing, by the recognition model, the difference between the reference medical image and the target medical image according to the brightness information of the pixel points in the converted reference medical image and the brightness information of the pixel points in the converted target medical image, so as to obtain a candidate non-lesion region in the target medical image includes:

obtain the difference between the brightness information of the pixel points in the converted reference medical image and the brightness information of the corresponding pixel points in the converted target medical image;

recognize pixel points of which the difference corresponding to brightness information is greater than a difference threshold from the converted target medical image as first target pixel points; and determine a region where the first target pixel points are located in the target medical image as a candidate non-lesion region in the target medical image.

In some embodiments, the candidate region size information includes a candidate region proportion of the candidate non-lesion region in the target medical image; the annotated size information includes a marked region proportion of the non-lesion region in the target medical image;

a way of adjusting, by the adjusting module 804, the candidate non-lesion region according to the annotated size information when the candidate region size information is not matched with the annotated size information, so as to obtain a target non-lesion region in the target medical image includes:

obtain a region proportion difference between the candidate region proportion and the marked region proportion;

determining that the candidate region size information is not matched with the annotated size information when the region proportion difference is greater than a proportion threshold; and adjust the candidate non-lesion region according to the marked region proportion to obtain the target non-lesion region.

In some embodiments, a way of adjusting, by the adjusting module 804, the candidate non-lesion region according to the marked region proportion to obtain the target non-lesion region includes:

expanding the candidate non-lesion region according to the marked region proportion when the candidate region proportion is less than the marked region proportion, so as to obtain the target non-lesion region; and reducing the candidate non-lesion region according to the marked region proportion when the candidate region proportion is greater than the marked region proportion, so as to obtain the target non-lesion region.

In some embodiments, a way of expanding, by the adjusting module 804, the candidate non-lesion region according to the marked region proportion when the candidate region proportion is less than the marked region proportion, so as to obtain the target non-lesion region includes:

obtaining expanding parameters when the candidate region proportion is less than the marked region proportion, the expanding parameters including an expanding shape and an expanding size;

iteratively expand the candidate non-lesion region according to the expanding parameters to obtain an expanded candidate non-lesion region;

obtain a region proportion of the expanded candidate non-lesion region in the target medical image as an expanded region proportion; and determining the expanded candidate non-lesion region of which the region proportion difference between the expanded region proportion and the marked region proportion is less than the proportion threshold as the target non-lesion region.

In some embodiments, a way of expanding, by the adjusting module 804, the candidate non-lesion region according to the marked region proportion when the candidate region proportion is less than the marked region proportion, so as to obtain the target non-lesion region includes:

obtaining pixel values of pixel points adjacent to the candidate non-lesion region in the target medical image and pixel values of pixel points in the candidate non-lesion region when the candidate region proportion is less than the marked region proportion;

cluster the pixel points in the candidate non-lesion region and the pixel points adjacent to the candidate non-lesion region according to the pixel values of the pixel points in the candidate non-lesion region and the pixel values of the pixel points adjacent to the candidate non-lesion region, so as to obtain a clustered region;

obtain a region proportion of the clustered region in the target medical image as a clustered region proportion; and determining the clustered region as the target non-lesion region when the region proportion difference between the clustered region proportion and the marked region proportion is less than the proportion threshold.

In some embodiments, a way of clustering, by the adjusting module 804, the pixel points in the candidate non-lesion region and the pixel points adjacent to the candidate non-lesion region according to the pixel values of the pixel points in the candidate non-lesion region and the pixel values of the pixel points adjacent to the candidate non-lesion region, so as to obtain a clustered region includes:

obtain a pixel difference between the pixel values of the pixel points adjacent to the candidate non-lesion region and the pixel values of the pixel points in the candidate non-lesion region;

determining the pixel points of which the corresponding pixel difference is less than a pixel difference threshold from the pixel points adjacent to the candidate non-lesion region as second target pixel points; and merge the region where the second target pixel points are located in the target medical image with the candidate non-lesion region to obtain the clustered region.

In some embodiments, a way of reducing, by the adjusting module 804, the candidate non-lesion region according to the marked region proportion when the candidate region proportion is greater than the marked region proportion, so as to obtain the target non-lesion region includes:

obtaining reduction processing parameters when the candidate region proportion is greater than the marked region proportion, the reduction processing parameters including a shape of reduction processing and a size of reduction processing;

iteratively reduce the candidate non-lesion region according to the reduction processing parameters to obtain a reduced candidate non-lesion region;

obtain a region proportion of the reduced candidate non-lesion region in the target medical image as a reduced region proportion; and determining the reduced candidate non-lesion region of which the region proportion difference between the reduced region proportion and the marked region proportion is less than the proportion threshold as the target non-lesion region.

In some embodiments, the candidate region size information includes a candidate region size of the candidate non-lesion region; the annotated size information includes a marked region size (e.g., annotated size) of the non-lesion region in the target medical image;

a way of adjusting, by the adjusting module 804, the candidate non-lesion region according to the annotated size information when the candidate region size information is not matched with the annotated size information, so as to obtain a target non-lesion region in the target medical image includes:

obtain a size difference between the candidate region size and the marked region size;

determining that the candidate region size information is not matched with the annotated size information when the region size difference is greater than a size threshold; and adjust the candidate non-lesion region according to the marked region size to obtain the target non-lesion region.

In some embodiments, a way of determining, by the determining module 803, region size information of the candidate non-lesion region as candidate region size information includes:

obtain a region size of the candidate non-lesion region and an image size of the target medical image, and determine a ratio of the region size of the candidate non-lesion region to the image size of the target medical image as the candidate region proportion; or obtain the number of the pixel points in the candidate non-lesion region and the number of the pixel points in the target medical image, and determine a ratio of the number of the pixel points in the candidate non-lesion region to the number of the pixel points in the target medical image as the candidate region proportion; and determine the candidate region proportion as the candidate region size information.

In some embodiments, a way of determining, by the determining module 803, region size information of the candidate non-lesion region as candidate region size information includes:

obtain a region size of the candidate non-lesion region to obtain a candidate region size; and determine the candidate region size as the candidate region size information.

In some embodiments, the apparatus further includes:

a marking module 805, configured to mark the target non-lesion region in the target medical image to obtain a marked target medical image; and a prediction module 806, configured to predict the target medical image by an image segmentation model to obtain a predicted non-lesion region in the target medical image, and mark the predicted non-lesion region in the target medical image to obtain a predicted target medical image.

The above-mentioned adjusting module 804 is further configured to adjust the image segmentation model according to the marked target medical image and the predicted target medical image to obtain a target medical image segmentation model.

In some embodiments, a way of adjusting, by the adjusting module 804, the image segmentation model according to the marked target medical image and the predicted target medical image to obtain a target medical image segmentation model includes:

determine a predicted loss value of the image segmentation model according to the marked target medical image and the predicted target medical image; and adjusting the image segmentation model according to the predicted loss value when the predicted loss value does not meet a convergence condition, so as to obtain a target medical image segmentation model.

In some embodiments, a way of marking, by the marking module 805, the target non-lesion region in the target medical image to obtain a marked target medical image includes:

binarizing the target medical image according to the pixel points in the target non-lesion region; and determine the binarized target medical image as the marked target medical image.

According to an embodiment of this application, the steps involved in the medical image processing method shown in FIG. 3 may be performed by modules in the medical image processing apparatus shown in FIG. 8. For example, S101 shown in FIG. 3 may be performed by the obtaining module 801 in FIG. 8; S102 shown in FIG. 3 may be performed by the recognition module 802 in FIG. 8; S103 shown in FIG. 3 may be performed by the determining module 803 in FIGS. 8; and S104 shown in FIG. 3 may be performed by the adjusting module 804 in FIG. 8.

According to an embodiment of this application, the modules of the image processing apparatus shown in FIG. 8 may be separately or wholly combined into one or several units, or one (or more) of the units herein may further be divided into a plurality of units of smaller functions. In this way, same operations may be implemented, and the implementation of the technical effects of the embodiments of this application is not affected. The foregoing modules are divided based on logical functions. In an actual application, a function of one module may also be implemented by a plurality of units, or functions of a plurality of modules are implemented by one unit. In other embodiments of this application, the medical image processing apparatus may also include other units. In an actual application, the functions may also be cooperatively implemented by other units and may be cooperatively implemented by a plurality of units.

According to an embodiment of this application, a computer program (including program codes) that can perform the steps in the corresponding method shown in FIG. 3 may be executed on a general computing device, such as a computer, which includes processing elements and storage elements such as a central processing unit (CPU), a random access memory (RAM), and a read-only memory (ROM), to construct the medical image processing apparatus shown in FIG. 8 and implement the medical image processing method in the embodiments of this application. The computer program may be recorded in, for example, a computer readable recording medium, and may be loaded into the foregoing computing device by using the computer readable recording medium, and executed by the computing device.

In the embodiment of this application, the computer device can recognize the difference between the target medical image and the reference medical image to obtain the candidate non-lesion region in the target medical image, and obtain the region size information of the candidate non-lesion region to obtain the candidate region size information.

If the candidate region size information is not matched with the annotated size information of the target medical image, it indicates that the difference between the recognized candidate non-lesion region and an actual non-lesion region in the target medical image is larger, that is, the accuracy of the recognized candidate non-lesion region is lower. Therefore, the candidate non-lesion region can be adjusted according to the annotated size information to obtain a target non-lesion region in the target medical image. In other words, the candidate non-lesion region in the target medical image is automatically recognized according to the reference medical image and the target medical image without manual participation, so that the accuracy and efficiency of recognizing the non-lesion region can be improved; and the recognized candidate non-lesion region is adjusted according to the annotated size information, so that the accuracy of recognizing the non-lesion region can be improved.

Figure 9:
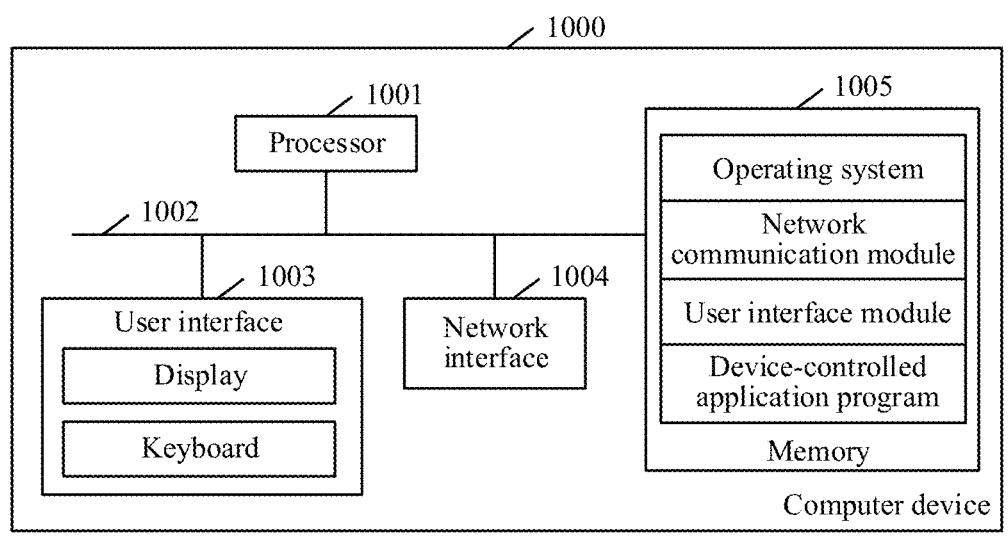
FIG. 9 is a schematic structural diagram of a computer device according to an embodiment of this application.

FIG. 9 is a schematic structural diagram of a computer device according to an embodiment of this application. As shown in FIG. 9, the computer device 1000 may include: a processor 1001, a network interface 1004, and memory 1005. Furthermore, the computer device 1000 may further include: a user interface 1003 and at least one communication bus 1002, wherein the communication bus 1002 is configured to implement the connection and communication among these components. The user interface 1003 may include a display, a keyboard, and optionally, the user interface 1003 may further include a standard wired interface and a standard wireless interface. The network interface 1004 may include a standard wired interface and a standard wireless interface (such as a Wi-Fi interface). The memory 1005 may be a high-speed random access memory (RAM), or may be a non-volatile memory, for example, at least one magnetic disk storage. The memory 1005 may further be at least one storage apparatus that is located far away from the processor 1001. As shown in FIG. 9, the memory 1005 used as a computer-readable storage medium (e.g., non-transitory computer-readable storage medium) may include an operating system, a network communication module, a user interface module, and a device-control application program.

In the computer device 1000 shown in FIG. 9, the network interface 1004 may provide a network communication function; the user interface 1003 is mainly configured to provide an input interface for a user; The processor 1001 may be configured to invoke the device-controlled application program stored in the memory 1005, so as to perform the following operations:

obtain a medical image set, the medical image set including a reference medical image, a target medical image to be recognized, and annotated size information of a non-lesion region in the target medical image, the target medical image including a lesion region and the non-lesion region, and the reference medical image including a lesion region;

recognize the difference between the reference medical image and the target medical image to obtain a candidate non-lesion region in the target medical image;

determine region size information of the candidate non-lesion region as candidate region size information; and adjusting the candidate non-lesion region according to the annotated size information when the candidate region size information is not matched with the annotated size information, so as to obtain a target non-lesion region in the target medical image.

It is to be understood that, the computer device 1000 described in this embodiment of this application may implement the descriptions of the medical image processing method in the embodiments corresponding to FIG. 3, or the descriptions of the medical image processing apparatus in the embodiment corresponding to FIG. 8. Details are not described herein again. In addition, the description of beneficial effects of the same method is not described herein again.

This application provides a computer program product or a computer program. The computer program product or the computer program includes computer instructions, and the computer instructions are stored in a computer-readable storage medium. A processor of a computer device reads the computer instructions from the computer-readable storage medium, and executes the descriptions of the medical image processing method in the embodiments corresponding to FIG. 3. Details are not described herein again. In addition, the description of beneficial effects of the same method is not described herein again. For technical details that are not disclosed in the embodiments of the computer-readable storage medium of this application, refer to the method embodiments of this application.

As an example, the above-mentioned program instruction may be deployed to be executed on a computer device, or deployed to be executed on multiple computer devices at the same location, or deployed to be executed on multiple computer devices that are distributed in multiple locations and interconnected by using a communication network. The plurality of computer devices that are distributed in the plurality of locations and interconnected by using the communication network can form a blockchain network.

Persons of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The foregoing storage medium may be a magnetic disk, a ROM, a RAM, or the like.

What is disclosed above is merely exemplary embodiments of this application, and certainly is not intended to limit the protection scope of this application. Therefore, equivalent variations made in accordance with the claims of this application shall fall within the scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs area determination and/or region adjustment. In practical application, the foregoing functions may be allocated to and completed by different functional modules according to requirements, that is, an inner structure of a device is divided into different functional modules to implement all or a part of the functions described above.

What is claimed is:

1. A medical image processing method performed by a computer device, comprising:
    obtaining a medical image set, the medical image set including a reference medical image, a target medical image to be identified, and annotated area size information of a non-lesion region in the target medical image, the target medical image including a lesion region and the non-lesion region, and the reference medical image including a lesion region;
    identifying one or more differences between the reference medical image and the target medical image to obtain a candidate non-lesion region in the target medical image;
    determining area size information of the candidate non-lesion region as candidate area size information; and
    adjusting the candidate non-lesion region according to the annotated area size information when the candidate area size information does not match the annotated area size information to obtain a target non-lesion region in the target medical image.

2. The method according to claim 1, wherein identifying one or more differences between the reference medical image and the target medical image includes:
    converting the reference medical image to an image in a target color space to obtain a converted reference medical image,
    converting the target medical image to an image in the target color space to obtain a converted target medical image;
    obtaining brightness information of pixel points in the converted reference medical image and brightness information of pixel points in the converted target medical image; and
    identifying the one or more differences between the reference medical image and the target medical image according to the brightness information of the pixel points in the converted reference medical image and the brightness information of the pixel points in the converted target medical image, to obtain a candidate non-lesion region in the target medical image.

3. The method according to claim 2, wherein identifying the one or more differences between the reference medical image and the target medical image according to the brightness information of the pixel points in the converted reference medical image and the brightness information of the pixel points in the converted target medical image includes:
    obtaining a difference between the brightness information of the pixel points in the converted reference medical image and the brightness information of the corresponding pixel points in the converted target medical image;
    identifying pixel points of which the difference corresponding to brightness information is greater than a difference threshold from the converted target medical image as first target pixel points; and
    determining a region where the first target pixel points are located in the target medical image as the candidate non-lesion region in the target medical image.

4. The method according to claim 1, wherein the candidate area size information comprises a candidate area proportion of the candidate non-lesion region in the target medical image; the annotated area size information comprises a marked area proportion of the non-lesion region in the target medical image;
- adjusting the candidate non-lesion region according to the annotated area size information when the candidate region size information does not match the annotated area size information, so as to obtain a target non-lesion region in the target medical image comprises:
- obtaining a difference between the candidate area proportion and the marked area proportion;
- determining that the candidate area size information is not matched with the annotated area size information when the difference is greater than a proportion threshold; and
- adjusting the candidate non-lesion region according to the marked area proportion to obtain the target non-lesion region.

5. The method according to claim 4, wherein adjusting the candidate non-lesion region according to the annotated area proportion to obtain the target non-lesion region comprises:
- expanding the candidate non-lesion region according to the annotated area proportion when the candidate area proportion is less than the marked area proportion, so as to obtain the target non-lesion region; and
- reducing the candidate non-lesion region according to the annotated area proportion when the candidate area proportion is greater than the annotated area proportion, so as to obtain the target non-lesion region.

6. The method according to claim 5, wherein expanding the candidate non-lesion region according to the annotated area proportion when the candidate area proportion is less than the annotated area proportion, so as to obtain the target non-lesion region comprises:
- obtaining expanding parameters when the candidate area proportion is less than the annotated area proportion, the expanding parameters comprising an expanding shape and an expanding size;
- iteratively expanding the candidate non-lesion region according to the expanding parameters to obtain an expanded candidate non-lesion region;
- obtaining a region proportion of the expanded candidate non-lesion region in the target medical image as an expanded region proportion; and
- determining the expanded candidate non-lesion region of which the area proportion difference between the expanded region proportion and the annotated area proportion is less than the proportion threshold as the target non-lesion region.

7. The method according to claim 5, wherein expanding the candidate non-lesion region according to the annotated area proportion when the candidate area proportion is less than the annotated area proportion, so as to obtain the target non-lesion region comprises:
- obtaining pixel values of pixel points adjacent to the candidate non-lesion region in the target medical image and pixel values of pixel points in the candidate non-lesion region when the candidate area proportion is less than the annotated area proportion;
- clustering the pixel points in the candidate non-lesion region and the pixel points adjacent to the candidate non-lesion region according to the pixel values of the pixel points in the candidate non-lesion region and the pixel values of the pixel points adjacent to the candidate non-lesion region, so as to obtain a clustered area;
- obtaining an area proportion of the clustered region in the target medical image as a clustered area proportion; and
- determining the clustered region as the target non-lesion region when a difference between the clustered area proportion and the annotated area proportion is less than the proportion threshold.

8. The method according to claim 7, wherein clustering the pixel points in the candidate non-lesion region and the pixel points adjacent to the candidate non-lesion region according to the pixel values of the pixel points in the candidate non-lesion region and the pixel values of the pixel points adjacent to the candidate non-lesion region, so as to obtain a clustered area comprises:
- obtaining a pixel difference between the pixel values of the pixel points adjacent to the candidate non-lesion region and the pixel values of the pixel points in the candidate non-lesion region;
- determining the pixel points of which the corresponding pixel difference is less than a pixel difference threshold from the pixel points adjacent to the candidate non-lesion region as second target pixel points; and
- merging an area corresponding to pixel locations of the second target pixel points with the candidate non-lesion region to obtain the clustered area.

9. The method according to claim 5, wherein reducing the candidate non-lesion region according to the annotated area proportion when the candidate region proportion is greater than the annotated area proportion, so as to obtain the target non-lesion region comprises:
- obtaining reduction processing parameters when the candidate region proportion is greater than the annotated area proportion, the reduction processing parameters comprising a shape of reduction processing and a size of reduction processing;
- iteratively reducing the candidate non-lesion region according to the reduction processing parameters to obtain a reduced candidate non-lesion region;
- obtaining a region proportion of the reduced candidate non-lesion region in the target medical image as a reduced area proportion; and
- determining the reduced candidate non-lesion region of which the region proportion difference between the reduced area proportion and the annotated area proportion is less than the proportion threshold as the target non-lesion region.

10. The method according to claim 1, wherein the candidate area size information comprises a candidate area size of the candidate non-lesion region; the annotated area information comprises an annotated area size of the non-lesion region in the target medical image;
- adjusting the candidate non-lesion region according to the annotated area size information when the candidate region size information is not matched with the annotated area size information to obtain a target non-lesion region in the target medical image includes:
- obtaining an area size difference between the candidate area size and the annotated area size;
- determining that the candidate region size information is not matched with the annotated size information when the area size difference is greater than a size threshold; and
- adjusting the candidate non-lesion region according to the annotated area size to obtain the target non-lesion region.

11. The method according to claim 4, wherein determining the area size information of the candidate non-lesion region as the candidate area size information comprises:

obtaining an area size of the candidate non-lesion region and an image size of the target medical image, and determining a ratio of the area size of the candidate non-lesion region to the image size of the target medical image as the candidate area proportion; or, obtaining the number of the pixel points in the candidate non-lesion region and the number of the pixel points in the target medical image, and determining a ratio of the number of the pixel points in the candidate non-lesion region to the number of the pixel points in the target medical image as the candidate region proportion; and determining the candidate area proportion as the candidate area size information.

12. The method according to claim 1, wherein the method further comprises:

marking the target non-lesion region in the target medical image to obtain a marked target medical image;

predicting the target medical image by an image segmentation model to obtain a predicted non-lesion region in the target medical image, and marking the predicted non-lesion region in the target medical image to obtain a predicted target medical image; and adjusting the image segmentation model according to the marked target medical image and the predicted target medical image to obtain a target medical image segmentation model.

13. The method according to claim 12, wherein adjusting the image segmentation model includes:

determining a predicted loss value of the image segmentation model according to the marked target medical image and the predicted target medical image; and adjusting the image segmentation model according to the predicted loss value when the predicted loss value does not meet a convergence condition, so as to obtain a target medical image segmentation model.

14. The method according to claim 12, wherein marking the target non-lesion region includes:

binarizing the target medical image according to the pixel points in the target non-lesion region; and determining the binarized target medical image as the marked target medical image.

15. A computer device, comprising:

one or more processors; and memory storing one or more programs, the one or more programs comprising instructions that, when executed by the one or more processors, cause the one or more processors to perform operations comprising:

obtaining a medical image set, the medical image set including a reference medical image, a target medical image to be identified, and annotated area size information of a non-lesion region in the target medical image, the target medical image including a lesion region and the non-lesion region, and the reference medical image including a lesion region;

identifying one or more differences between the reference medical image and the target medical image to obtain a candidate non-lesion region in the target medical image;

determining area size information of the candidate non-lesion region as candidate area size information; and adjusting the candidate non-lesion region according to the annotated area size information when the candidate area size information does not match the annotated area size information, so as to obtain a target non-lesion region in the target medical image.

16. The computer device according to claim 15, wherein identifying one or more differences between the reference medical image and the target medical image includes:

converting the reference medical image to an image in a target color space to obtain a converted reference medical image, converting the target medical image to an image in the target color space to obtain a converted target medical image;

obtaining brightness information of pixel points in the converted reference medical image and brightness information of pixel points in the converted target medical image; and identifying the one or more differences between the reference medical image and the target medical image according to the brightness information of the pixel points in the converted reference medical image and the brightness information of the pixel points in the converted target medical image, so as to obtain a candidate non-lesion region in the target medical image.

17. The computer device according to claim 16, wherein identifying the one or more differences between the reference medical image and the target medical image according to the brightness information of the pixel points in the converted reference medical image and the brightness information of the pixel points in the converted target medical image includes:

obtaining a difference between the brightness information of the pixel points in the converted reference medical image and the brightness information of the corresponding pixel points in the converted target medical image;

identifying pixel points of which the difference corresponding to brightness information is greater than a difference threshold from the converted target medical image as first target pixel points; and determining a region where the first target pixel points are located in the target medical image as the candidate non-lesion region in the target medical image.

18. The computer device according to claim 15, wherein the candidate area size information comprises a candidate area proportion of the candidate non-lesion region in the target medical image; the annotated area size information comprises a marked area proportion of the non-lesion region in the target medical image;

adjusting the candidate non-lesion region according to the annotated area size information when the candidate region size information does not match the annotated area size information, so as to obtain a target non-lesion region in the target medical image comprises:

obtaining an area proportion difference between the candidate area proportion and the marked area proportion;

determining that the candidate area size information is not matched with the annotated area size information when the area proportion difference is greater than a proportion threshold; and adjusting the candidate non-lesion region according to the marked area proportion to obtain the target non-lesion region.

19. The computer device according to claim 15, wherein the candidate area size information comprises a candidate area size of the candidate non-lesion region; the annotated area information comprises an annotated area size of the non-lesion region in the target medical image;

adjusting the candidate non-lesion region according to the annotated area size information when the candidate region size information is not matched with the annotated area size information to obtain a target non-lesion region in the target medical image includes:

obtaining an area size difference between the candidate area size and the annotated area size;

determining that the candidate region size information is not matched with the annotated size information when the area size difference is greater than a size threshold; and adjusting the candidate non-lesion region according to the annotated area size to obtain the target non-lesion region.

20. A non-transitory computer-readable storage medium, storing a computer program, the computer program, when executed by one or more processors of a computer device, cause the one or more processors to perform operations comprising:

obtaining a medical image set, the medical image set including a reference medical image, a target medical image to be identified, and annotated area size information of a non-lesion region in the target medical image, the target medical image including a lesion region and the non-lesion region, and the reference medical image including a lesion region;

identifying one or more differences between the reference medical image and the target medical image to obtain a candidate non-lesion region in the target medical image;

determining area size information of the candidate non-lesion region as candidate area size information; and adjusting the candidate non-lesion region according to the annotated area size information when the candidate area size information does not match the annotated area size information, so as to obtain a target non-lesion region in the target medical image.

\* \* \* \* \*